United States Patent
Hwang et al.

(10) Patent No.: US 7,721,236 B2
(45) Date of Patent: May 18, 2010

(54) METHOD AND APPARATUS OF ESTIMATING CIRCUIT DELAY

(75) Inventors: Myeong-Eun Hwang, West Lafayette, IN (US); Seong-Ook Jung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 11/532,878

(22) Filed: Sep. 18, 2006

(65) Prior Publication Data

US 2007/0136706 A1    Jun. 14, 2007

Related U.S. Application Data

(60) Provisional application No. 60/717,595, filed on Sep. 16, 2005.

(51) Int. Cl.
G06F 17/50    (2006.01)
G06F 9/45    (2006.01)

(52) U.S. Cl. .............................. 716/6; 716/4

(58) Field of Classification Search ............ 716/4, 716/6
See application file for complete search history.

(56) References Cited

U.S. PATENT DOCUMENTS

| | | | |
|---|---|---|---|
| 6,253,361 B1 | 6/2001 | Buch | |
| 6,553,338 B1 * | 4/2003 | Buch et al. | 703/14 |
| 6,622,291 B1 * | 9/2003 | Ginetti | 716/9 |
| 2003/0191619 A1 * | 10/2003 | Davies et al. | 703/14 |
| 2004/0252658 A1 | 12/2004 | Hosein et al. | |
| 2005/0059421 A1 | 3/2005 | Reed et al. | |
| 2005/0147022 A1 | 7/2005 | Hosur et al. | |

FOREIGN PATENT DOCUMENTS

WO    0124568 A1    4/2001

OTHER PUBLICATIONS

Abou-Seido, A., et al., Fillted Elmore Delay: A Simple and Accurate Interconnect Delay Model. IEEE Transactions on Very Large Scale Integration (VLSI) Systems, Jul. 2004, pp. 691-696, vol. 12, No. 7.

Chatzigeorgiou, A., et al., A Modeling Technique for CMOS Gates. IEEE Transactions on Computer-Aided Design of Integrated Circuits and Systems, May 1999, pp. 557-575, vol. 18, No. 5.

Daga, J., et al., A Comprehensive Delay Macro Modeling for Submicrometer CMOS Logics. IEEE Journal of Solid-State Circuits, Jan. 1999, pp. 42-55, vol. 34, No. 1.

(Continued)

Primary Examiner—Stacy A Whitmore
Assistant Examiner—Magid Y Dimyan
(74) Attorney, Agent, or Firm—Jiayu Xu

(57) ABSTRACT

Methods and apparatus for estimating the propagation delay along a logical signal path are described herein. The methods and apparatus account for the behavior of multi-stage logic gates along a signal path, initial input transition times, inter-stage fanouts, as well as different logic gate types. The methods and apparatus convert signal transition features into an effective fanout to provide estimates of gate delay dependencies on input slope and gate logic topology.

20 Claims, 7 Drawing Sheets

OTHER PUBLICATIONS

Elmore, W.C. The Transient Response of Damped Linear Networks with Particular Regard to Wideband Amplifiers, Downloaded Oct. 2, 2006 to 129.46.196.188, see http://jap.aip.org/jap/copyright.jsp. pp. 55-62.

Eo, Y., et al., A Decoupling Technique for Efficient Timing Analysis of VLSI Interconnects with Dynamic Circuit Switching. IEEE Transactions on Computer-Aided Design of Integrated Circuits and Systems, Sep. 2004, pp. 1321-1337, vol. 23, No. 9.

Hirata, A., et al., Estimation of Propagation Delay Considering Short-Circuit Current for Static CMOS Gates. IEEE Transactions on Circuits and Systems-I. Fundamental Theory and Applications, Nov. 1998, pp. 1194-1198, vol. 45, No. 11.

Im, H., et al., VTCMOS Characteristics and Its Optimum Conditions Predicted by a Compact Analytical Model. IEEE Transactions on Very Large Scale Integration (VLSI) Systems, Oct. 2003, pp. 755-761, vol. 11, No. 5.

Kabbani, A., et al., Delay Analysis of CMOS Gates Using Modified Logical Effort Model. IEEE Transactions on Computer-Aided Design of Integrated Circuits and Systems, Jun. 2005, pp. 937-947, vol. 24, No. 6.

Maxfield, C. Designus Maximus Unleashed! Chapter 25, University of California San Diego Library, 31822026353714.

Rabaey, J. Digital Integrated Circuits, Prentice Hall Electronics and VLSI Series, Prentice Hall, Upper Saddle River, New Hersey 07458.

Riblet, H.J., et al., A General Divergence Formula, downloaded Oct. 2, 2006 to 129.46.196.188, see http://jap.aip.org/jap/copyright.jsp, pp. 63-.

Sakurai, T., et al., Delay Analysis of Series-Connected MOSFET Circuits. IEEE Journal of Solid-State Circuits, Feb. 1991, pp. 122-131, vol. 26, No. 2.

Sakurai, T., et al., A Simple Short-Channel MOSFET Model and Its Application to Delay Analysis of Inverters and Series-Connected MOSFETs. IEEE, 1990, pp. 105-108.

Sutherland, I., et al., Logical Effort: Designing Fast CMOS Circuits. Morgan Kaufmann Publishers, pp. 1-239.

International Technology Roadmap for Semiconductors 2003 Edition, Executive Summary, The International Technology Roadmap for Semiconductors: 2003, pp. 1-65.

International Technology Roadmap for Semiconductors 2003 Edition, Interconnect, The International Technology Roadmap for Semiconductors: 2003, pp. 1-41.

International Technology Roadmap for Semiconductors 2003 Edition, Test and Test Equipment, The International Technology Roadmap for Semiconductors: 2003, pp. 1-59.

Pileggi, L., Timing Metrics for Physical Design of Deep Submicron Technologies. Department of Electrical and Computer Engineering, Carnegie Mellon University, 1998, Monterey, CA, pp. 28-33.

Harris, D.: "Logical Effort: Designing for Speed on the Back of an Envelope," [Online] Retrieved from the Internet: URL: http://web.archive.org/web/20030927214026/http://www.stanford.edu/class/ee371/handouts/logicalEffort.pdf> [Retrieved on Jan. 24, 2007].

International Search Report, PCT/US2006/036367 - International Search Authority - European Patent Office, Jan. 31, 2007.

Written Opinion, PCT/US2006/036367 - International Search Authority - European Patent Office, Feb. 12, 2007.

* cited by examiner

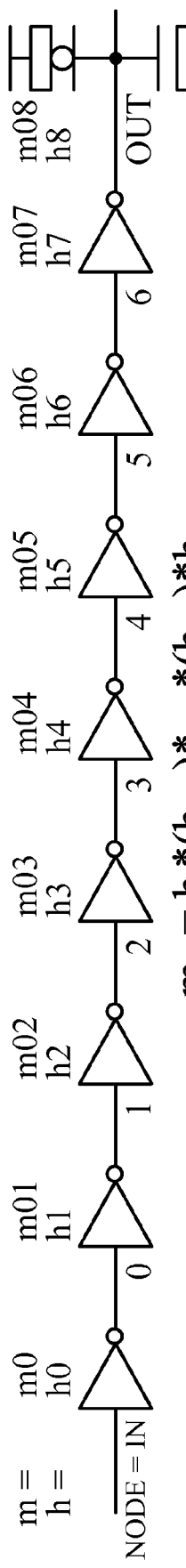
FIG. 3
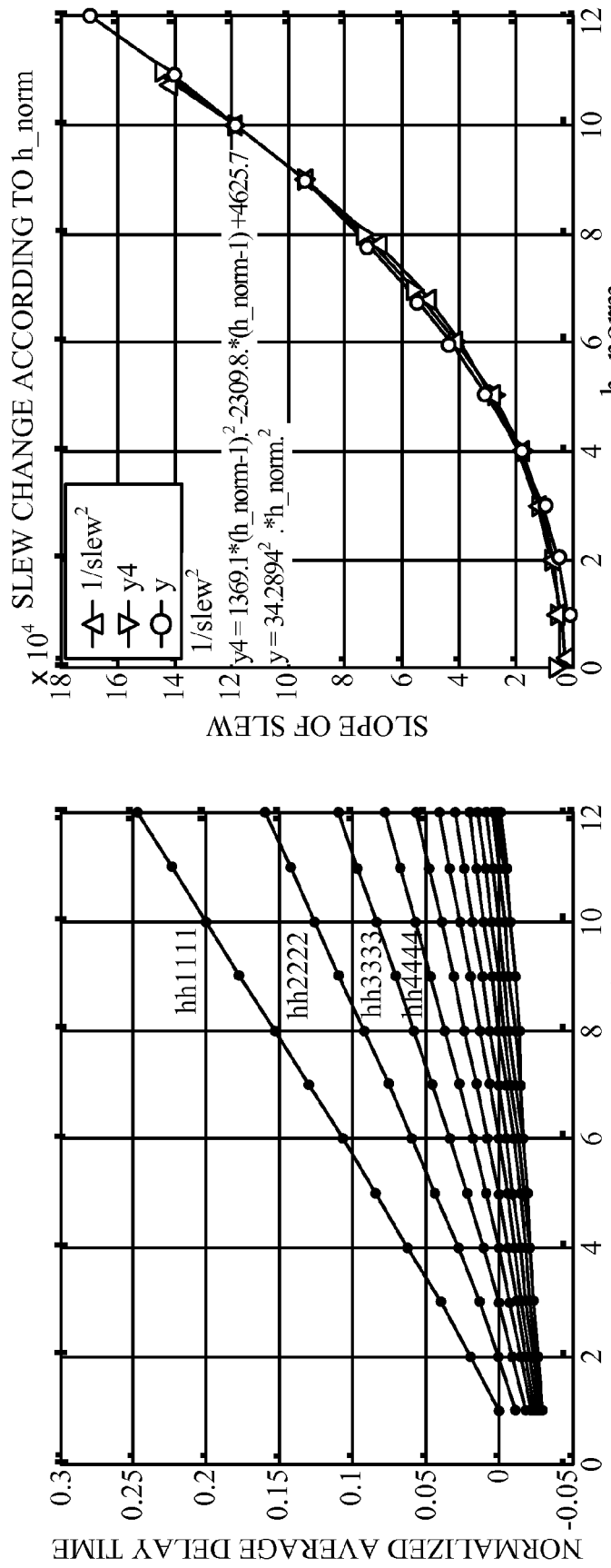
FIG. 4a
FIG. 4b

METHOD AND APPARATUS OF ESTIMATING CIRCUIT DELAY

CROSS-REFERENCES TO RELATED APPLICATIONS

This application claims the benefit of U.S. Provisional Application No. 60/717,595, filed Sep. 16, 2005, which is hereby incorporated herein by reference in its entirety.

BACKGROUND

I. Introduction

As today's aggressive scaling down enables circuit dimensions plunge into the nanometer regime (sub-100 nm) and below, the significance of interconnect delay effect that have been considered as relatively negligible in previous technologies emerges as one of the serious challenges to the VLSI design and thus necessitates new design methodologies to address it (Semiconductor Industry Association. *The International Technology Roadmap for Semiconductors*. (2003 Edition)).

Decreasing conductor width causes an increase in interconnect resistance while decreasing conductor space causes an increase in interconnect capacitance. Three-dimensional effects such as fringing and interline coupling become stronger as a conductor become relatively taller in comparison to their width. On the other hand, as a device scales down, there may be an improvement in its operating speed or output parasitics that will make the parasitics of interconnect relatively larger in comparison to the parasitics of the gate driving or driven by it. Hence, while the gate delay gets improved, the interconnect delay between the gates becomes unimproved or even worse. Moreover, the constant evolution in the VLSI technology enables a new era in which billions of devices are integrated into a single chip. However, as the technology scales device size down, there is a tendency to place more functionality (or devices) on the chip. Hence, the amount of interconnect among the devices may grow drastically with the number of transistors. The average length of interconnects may also increase in order to connect the circuit elements. It is often that the chip area is limited by the physical interconnect area. The interconnect dimensions are scaled down as much as possible and more metal layers are used. Hence the density of interconnects increases.

Such unbalancing or opposite scaling effects between interconnect and gate causes one of the most serious problems in nanoscale technologies. Due to technology scaling, delay in a logic gate (also referred to as intrinsic delay) continuously reduced to be in the picosecond range. However, interconnect delay (also referred to as extrinsic delay) has not scaled down at the same rate as a transistor or logic gate with process evolution because the reduced wire geometry leads to an increase in resistance and capacitance of the interconnect and the larger parasitic delay. As a result, interconnect delay has become a larger fraction of overall delay and this trend seems to continue or become more serious in future technology generations (Semiconductor Industry Association. *The International Technology Roadmap for Semiconductors*. (2003 Edition); Rabaey, J. M. *Digital Integrated Circuits, A Design Perspective*, Prentice Hall, Inc., New Jersey (1996)).

Numerous studies have proposed interconnect models from a theoretical point of view. The Elmore delay model (Elmore, W. C. *J. Applied Physics*, 19:55-63 (1948)), or the first moment of the impulse response, is a widely used interconnect delay model at various VLSI circuit design stages, particularly for resistance and capacitance tree analysis. It has a simple analytical function and closed form. Moreover, it is very efficient in getting an insight for the delay dependency on circuit parameters. However, it has been observed that it almost always overestimates the wire delay with respect to the Hspice simulation. Furthermore, it can not address delay sensitivities since it fails to represent the resistance shielding effect. To compensate for these limitations of the Elmore delay, the scaled version of the Elmore delay model (Pileggi, L. *In Proc. Intl. Symp. on Physical Design*, pp. 28-33 (1998)) introduces the scaling factor, but it can underestimate a large portion of delays at this time. The Fitted Elmore delay model (Ishaq, A. et al. *IEEE Trans. Very Large Scale Integration (VLSI) Systems*, 12(7):691-696 (July 2004)) that applies a curve fitting techniques to the Hspice experiments has a much better accuracy over the original Elmore delay model while it inherits the main advantages of the original one. However, it still does not convey the resistance shielding effect. Hence it can compute inaccurate delay and delay sensitivities over circuit parameters. These modified Elmore delay models basically consider the first momentum response. These models have worked well for so long that many take it for granted today.

Another obstacle from a practical point of view is the simulation time at the early design phases. Several transistor-level simulators are available in the market. These simulators basically follow two steps to analyze circuit design: (1) linearization of a nonlinear target circuit model and construction of matrix equations with ready-known information including initial conditions; (2) solving the matrix equations. Actually, it is just all about solving KCL and KVL equations ($\Sigma I_k = 0$ and $\Sigma V_k = 0$) that are nonlinear differential equations based on the nonlinear characteristics of a transistor. At each time step, a simulator builds a small signal model at the operating point (i.e., linearization). Even for a small circuit simulation, substantial numerical algebra is needed to calculate solutions and hence the circuit's behavior. Instead of using the conventional direct method and iterative method, some commercial simulators may adopt approaches, such as a look-up table, event-driven algorithm or multi-time step algorithm, hierarchical simulation and parallel computation etc. These are used to speedup the simulation time as well as to save memory. However, it is still a long process, and needless to say, simulation time increases exponentially with the size of the target circuit. Furthermore, considering the nature of circuit design, iterative simulations after circuit modification frequently happen and thus require more analysis time during design optimization. A simple yet efficient design methodology will be very useful in reducing the development time.

SUMMARY

Methods and apparatus for estimating the propagation delay along a logical signal path are described herein. The methods and apparatus account for the behavior of multi-stage logic gates along a signal path, initial input transition times, inter-stage fanouts, as well as different logic gate types. The methods and apparatus convert signal transition features into an effective fanout to provide estimates of gate delay dependencies on input slope and gate logic topology.

Aspects of the invention include a method of estimating a circuit delay that includes receiving device parameters corresponding to a circuit, determining an electrical effort of each stage in the circuit, determining an effective fanout at an input of an initial stage, determining a gate delay based in part on an electrical effort at the output of the initial stage, and determining a gate signal transition time based on an electrical effort of the initial stage and at least one subsequent stage.

Aspects of the invention include a method of estimating a circuit delay that includes determining a gate delay based on an electrical effort of the gate and at least one additional gate coupled to the gate, and determining a signal transition time based on the electrical effort of the gate and at least one additional gate coupled to the gate.

Aspects of the invention include an apparatus configured to estimate a circuit delay. The apparatus includes a first memory configured to store device parameters, a second memory configure to store interconnect parameters, an electrical effort module coupled to the first and second memories and configured to determine an electrical effort at each device in the circuit, and a Signal Transition Logical Effort (STLE) module configured to determine the circuit delay based in part on the device parameters, interconnect parameters, and electrical effort at each device.

Aspects of the invention include an apparatus configured to estimate a circuit delay. The apparatus includes means for storing device parameters corresponding to a circuit, means for determining an electrical effort of each stage in the circuit, means for determining an effective fanout at an input of an initial stage, means for determining a gate delay based in part on an electrical effort at the output of the initial stage, and means for determining a gate signal transition time based on an electrical effort of the initial stage and at least one subsequent stage.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIG. 3 is a simplified functional block diagram of an example of a cascaded inverter chain.

FIG. 4a is a simplified diagram of a normalized gate delay difference from a nominal gate delay.

FIG. 4b is a simplified diagram of an approximation of slope based on nominal electrical effort.

DETAILED DESCRIPTION OF EMBODIMENTS OF THE INVENTION

In practical VLSI design, wires are usually driven by drivers or drive other logic gates so that they come with a certain slope during transition. An important issue of interconnect delay in nanoscale IC design is the impact of interconnects on waveform shape at the output of a gate (Elmore, W. C. *J. Applied Physics*, 19:55-63 (1948)). The waveform is significantly different from a straight line during a transition and includes a distinctive waveform tail, mainly due to the increased wire parasitics. It further shows that the step or linear ramp functions are no longer good enough to represent a signal transition.

The other critical shortcoming of previous interconnect models is the uncertainty of its accuracy and the restriction to it being only an estimate for the linear function response delay. Unavoidably, they have a small chance to capture the slope (called slew rate or simply slew) dependency in interconnect delay model.

The assumption that waveforms can be closely approximated with a simple linear model breaks down with modern technologies, mainly due to the increased importance of an interconnect delay in a circuit. The driver delay (specifically nonlinear driver impedance) and the interconnect delay are interdependent on each other. Hence, it has become important to account for the interdependency between driving stages and interconnects in total delay consideration.

Interconnect delay effects in nanotechnology have been investigated with a single chip using the standard CMOS 90 nm and 65 nm processes. An improved method and apparatus for determining the delay is described herein and is referred to as Interconnect Effort or Signal Transition Logical Effort (STLE). Four types of test circuits have been implemented to consider the impacts of wiring capacitance and wiring resistance on the interconnect delay.

The silicon and experimental data show that interconnect contributes to much more of a circuit delay than a gate in the 90 nm process. The method of the Interconnect Effort is relatively simple but efficient. The proposed methodology has matched well with SPICE simulations with less than a ±5% error. Most importantly, the Interconnect Effort delay estimate can be used as an initial calculation to estimate the circuit delay for a gate-driven wire as well as a pure gate chain.

The methods and apparatus described herein can be applied to practical circuits as a quick reference, especially in nanoscale design, where consideration of the interconnect parasitics is critical in determining the best gate sizes or driving capabilities with tight performance and area requirement. This also provides an insight into how both wires as well as sizes of different transistors affect the circuit delay.

Figure 1:
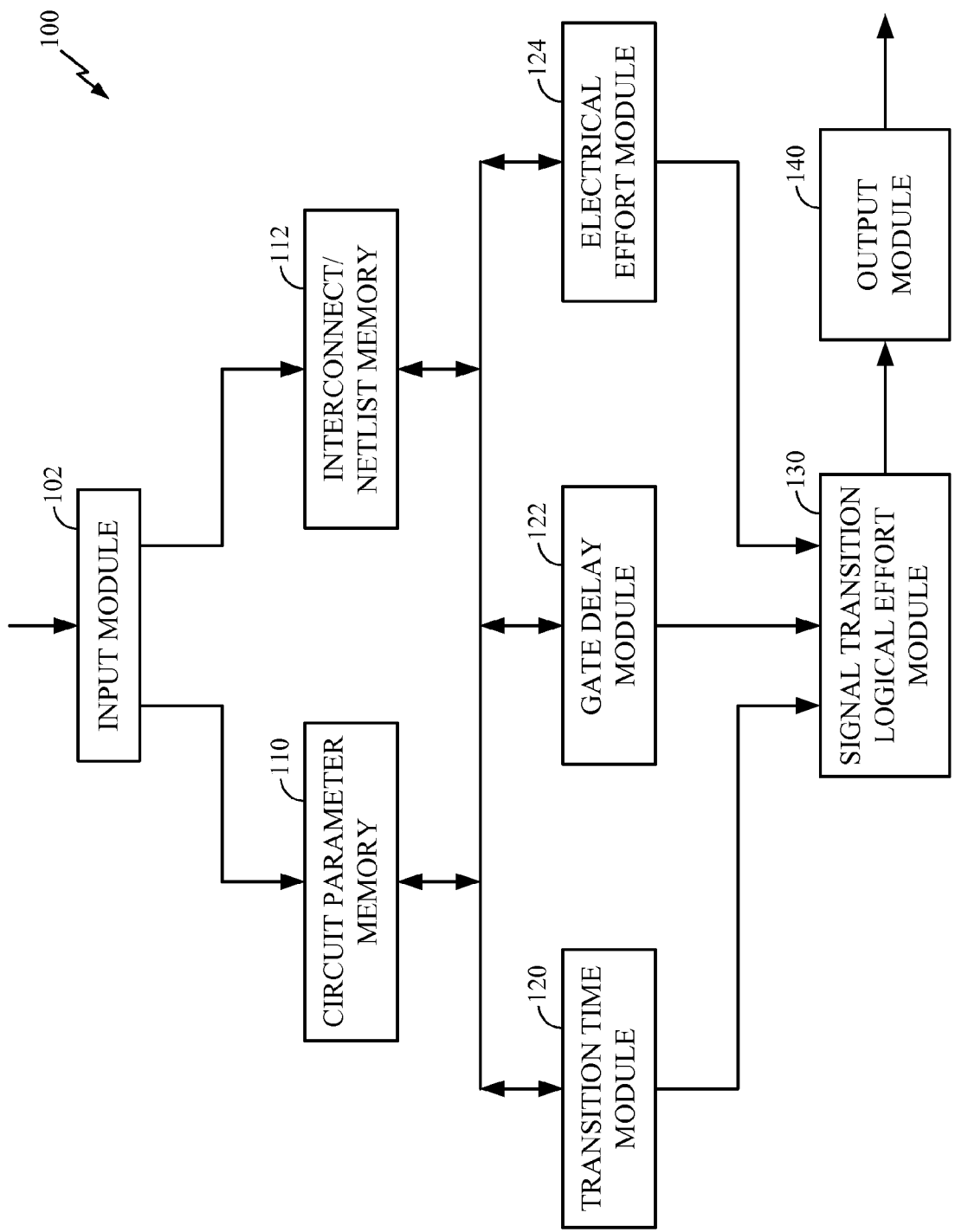
FIG. 1 is a simplified functional block diagram of an embodiment of a delay estimation apparatus.

FIG. 1 is a simplified functional block diagram of an embodiment of a delay estimation apparatus 100. The apparatus 100 can be used, for example, to estimate a propagation delay of a select circuit path from a plurality of circuit paths in an integrated circuit. Often, an integrated circuit or some other logic system includes one or more critical timing paths that require iterative analysis and modification. The STLE methods and apparatus described herein enable the timing of critical circuit paths to be quickly analyzed without the need for extensive SPICE circuit analysis.

The apparatus 100 includes an input device for receiving the various gate and interconnect parameters. The gate parameters, including the various gate sizes, can be stored in a circuit memory 110. The interconnect parameters, including the connections and dimensions defining an interconnected circuit can be stored as part of a netlist in a netlist memory 112. In one example, the input device 102 is an electronic port that can receive a logical system definition, such as a SPICE circuit definition. The input device 102 can also include a user interface that permits a user to select a particular circuit path from the logical system definition for propagation delay analysis. For example, the user interface of the input device 102 may allow a user to highlight a portion of a schematic of the logical system for analysis.

An electrical effort module 124 is coupled to the circuit memory 110 and the netlist memory 112. The electrical effort module 124 can determine, based on the gate topologies an electrical effort, or fanout of each stage. The electrical effort can be determined, for example, based on a normalized or standard gate model. Typically, the electrical effort is the size ratio of two cascaded stages. However, the length and dimensions of the interconnect contribute to the electrical effort.

A transition time module 120 is coupled to the circuit memory 110 and the netlist memory 112. The transition time module 120 is configured to determine, based on the various parameters of the selected circuit portion, a transition time or slope of the rise and fall times of the gates relative to the electrical effort.

A gate delay module 122 is coupled to the circuit memory 110 and the netlist memory 112. The gate delay module 122 determines the high-to-low and low-to-high gate delays as a function of the electrical effort.

A Signal Transition Logical Effort (STLE) module 130 is coupled to each of the transition time module 120, gate delay module 122, and electrical effort module 124. The STLE module 130 uses each of the individual gate characteristics to determine the aggregate propagation delay characteristics of the selected circuit portion.

The STLE module 130 determines the aggregate propagation delay be analyzing each stage of the selected circuit portion individually and serially, based on the results of the analysis of prior stages. The STLE module 130 initially characterizes an input stage based on an initial or primary input signal slope and an effective fanout of the first stage.

The STLE module 130 determines the gate delay for the initial stage based on the electrical effort. The STLE module 130 uses the electrical effort of the first stage to determine the transition time of the first stage. This transition time is used to determine the effect on the delay of the next stage.

The STLE module 130 continues to determine the propagation delay through each stage, based on the electrical effort seen by the stage and the effects of earlier stages. At the final stage, the STLE module 130 determines the delay based on the final load. The STLE module 130 can provide the final output, as well as any intermediate output, to an output device 140 for output to the user. For example, the output device 140 can display the estimated delays at the output of each of the stages, as well as the final propagation delay through the selected circuit portion.

Figure 2:
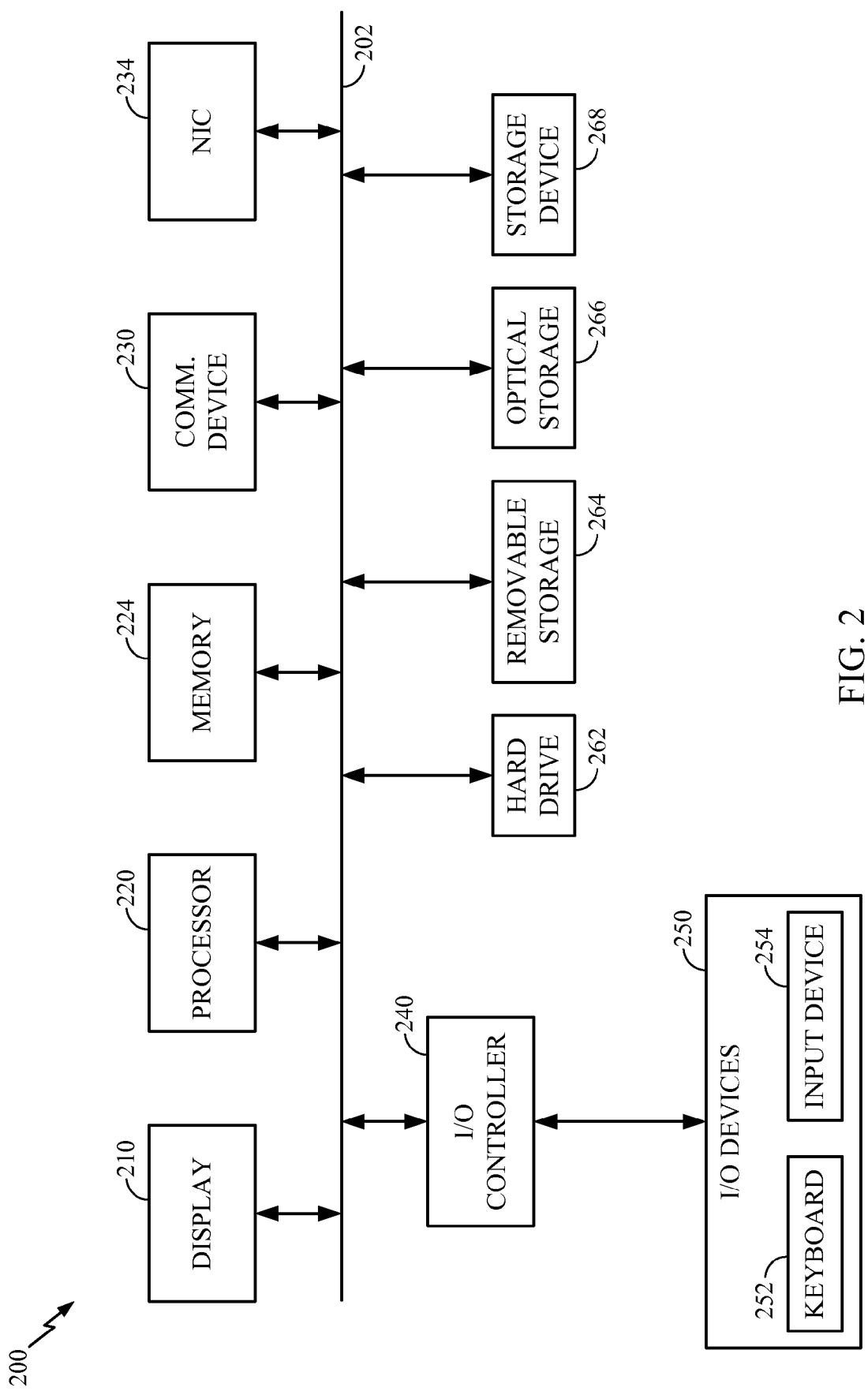
FIG. 2 is a simplified functional block diagram of an embodiment of a processor platform for delay estimation.

FIG. 2 is a functional block diagram of a Logical Interconnect delay estimation apparatus 200. Similar apparatus 200 can be used, for example as the circuit delay estimation apparatus of FIG. 1.

The delay estimation apparatus 200 can include a display 210, I/O devices 250 including a keyboard 252 and an input device 254, a processor 220, memory 224, an I/O controller 240, a hard drive 262, one or more removable storage drives 264, which can include a floppy drive, an optical storage 266, some other storage devices 268, a communication device 230 such as a modem, and a network interface card (NIC) 234. The various elements can be coupled using one or more computer busses 202 within the delay estimation apparatus 200. The one or more storage devices 268 can include, but are not limited to, ROM, RAM, non-volatile RAM, flash memory, magnetic storage, optical storage, tape storage, hard disk storage, and the like, or some other form of processor readable media.

The circuit can be loaded or otherwise entered to memory 224, and the processor 220 can execute one or more processor readable instructions stored in memory 224 to provide the STLE analysis of a selected circuit portion. Because the STLE delay analysis is relatively quick, a user can modify parameters related to a critical circuit path and re-run the STLE analysis numerous times to iteratively optimize a critical circuit path.

The interconnect effort propagation delay estimation method extends the method of the logical effort, and provides a simple and efficient method for estimating the expected delays of a circuit. The description herein focuses on an inverter chain with a wire load of various length and defines the metrics of a logic gate to be an average gate delay (referred to simply as a "delay" unless otherwise noted) from the rising and falling transitions. A long wire is often driven by an inverter chain as in a memory. However, an inverter chain is described for the sake of simplicity and is not a limitation on the operation of the methods and apparatus described herein. A typical logic gate can be described in terms of its relation to an inverter, and thus, the operation of the methods and apparatus to other gate types and combinations of gate types can be implied from the description of the inverter chain.

II. Logical Effort

A. The Unitless Delay of a Gate with Some Parameters of the Logical Effort

The method of logical effort describes delays caused by the capacitive load that is driven by the driver and by the topology of the driver. The theory of the logical effort stems from a simple model. The delay of a gate has two components: an intrinsic delay driving internal parasitics, and an effort delay driving a capacitive load. The effort depends on the ratio of the load size to the gate size as well as on the complexity of the gate. Parameter $h_i$, so called the electrical effort of the i-th gate, represents a ratio of the capacitive load $C_{i+1}$ driven by the gate to the input capacitance $C_i$ at the corresponding input terminal of the gate. The parameter $g_i$, the logical effort of the i-th gate, characterizes its complexity. The effort-based model is basically a reformulation of the conventional switch model of a CMOS circuit. The absolute delay of a chain of gates is defined to be (1) in the unit of $\tau$, the basic delay unit in time of an inverter driving $$d_{abs} = \tau \sum_i (g_i \times h_i + p_i) \quad (1)$$
$$= \tau \sum_i d_i$$

another identical inverter with no parasitics that characterizes a particular integrated circuit fabrication process. The absolute delay is the product of a unitless delay d and the delay unit $\tau$. For simplicity, delays expressed herein are provided in the unit of $\tau$.

The electrical effort describes how the electrical environment of the logic gate affects performance and how the size of the transistors in the gate determines its load-driving capability. The logical effort expresses its ability to produce output current. Equivalently, the logical effort of a logic gate tells how much worse it is at producing an output current than an inverter, given that each of its inputs may only have the same input capacitance as the inverter. It is independent of the size of the transistors in a circuit and depends only on the topology of the gate. The logical effort of an inverter is normalized to 1, and of other gates, calculated based on their internal topologies.

The product of the logical effort and the electrical effort is often referred to as the stage effort or effort delay. Parameter p is the intrinsic parasitic delay that highly depends on both the fabrication process and layout strategy. The major contribution to the parasitic delay is the capacitance of the source and drain regions of the transistors that drive the output. Since a wider transistor supporting a larger output current has correspondingly larger diffusion capacitance, the parasitic delay is "theoretically" fixed and independent of the size of the logic gate and of the load the load capacitance it drives. Separating the four contributions, τ, g, h, and p, the method of the logical effort: (1) the process parameter τ represents the speed of the basic transistors; (2) the parasitic delay p expresses the intrinsic delay of the date due to its own internal capacitance, which is largely independent of the size of the transistors in the gate width; (3) combines with the electrical effort h the effects of external load, that establishes $C_{i+1}$, with the sizes of the transistors in the logic gate that establish $C_i$; and finally (4) expresses with the logical effort g the effects of the circuit topology on the delay free of consideration of loading or transistor size. This is useful since it depends only on circuit topology.

The measured process parameter, logical effort, electrical effort and parasitic effort values for a few CMOS logic gates using logic gate chains in 65 nm process are shown in Table 1.

design. A model of the cost of computation based on the logical effort far more accurately portrays the time and space required to complete a calculation than does a simple count of logic gates, perhaps with restricted number of inputs.

C. Shortcoming of the Logical Effort

The logical effort is based on a very simple premise: equalizing the effort delay of each stage. The simplicity of this method is its greatest strength, but it also results in a number of limitations: (1) The RC delay model is overly simplistic. In particular, it fails to capture the effects of velocity saturation and of variable rise times (Pileggi, L. *In Proc. Intl. Symp. on Physical Design*, pp. 28-33 (1998)). Fortunately, rise times tend to be about equal in well-designed circuits with equal effort delay. Velocity saturation can also be handled by characterizing the logical effort of gates through simulation. (2) The logical effort explains how to design a path for maximum speed, but does not easily show how to design a path for a minimum area or power under a fixed-delay constraint. (3) The logical effort calculations can be difficult for paths that branch out having a different number of stages or different parasitic delays on each branch. Usually the logical effort calculation for such circuit requires iteration. Iteration is also required when a fixed-wire capacitance is comparable to the

TABLE 1

The measured logical efforts and parasitic efforts for various gates in 65 nm technology.

| Gate type | size | Vth | τ | g | p | size | Vth | τ | g | p |
|---|---|---|---|---|---|---|---|---|---|---|
| Inverter | c (1×) | hvt | 8.90 | 1.00 | 1.15 | d (2×) | hvt | 8.90 | 1.00 | 1.04 |
| | | nvt | 5.86 | 1.00 | 1.09 | | nvt | 5.86 | 1.00 | 0.99 |
| | | lvt | 5.15 | 1.00 | 1.11 | | lvt | 5.13 | 1.00 | 1.00 |
| NAND2 | c (1×) | hvt | | 1.22 | 1.62 | d (2×) | hvt | | 1.22 | 1.61 |
| | | nvt | | 1.21 | 1.49 | | nvt | | 1.20 | 1.47 |
| | | lvt | | 1.20 | 1.54 | | lvt | | 1.19 | 1.53 |
| NOR2 | c (1×) | hvt | | 1.56 | 1.79 | d (2×) | hvt | | 1.56 | 1.79 |
| | | nvt | | 1.50 | 1.69 | | nvt | | 1.50 | 1.69 |
| | | lvt | | 1.51 | 1.73 | | lvt | | 1.51 | 1.73 |

B. Insights from the Logical Effort

The theory of the logical effort is most valuable for the insights into several aspects of circuit design. While the same results might emerge from long design experience or from many circuit simulations, they emerge quite readily from the logical effort. The interesting results may include the following: (1) The idea of a numeric "logical effort" that characterizes the delay characteristics of a logic gate or a path through a network is very powerful. It allows one to compare alternative circuit topologies and to show that some topologies are uniformly better than others. (2) Circuits are fastest when the effort delay of each stage is the same. Moreover, a typical design selects the number of stages to make this effort about four. (3) The delay of a well-designed path is about 4 ($\log_4$ G+$\log_4$ H)+P=$\log_4$ F fanout-of-four (FO4) delays. Each quadrupling of the load driven by the path adds about the delay of an FO4 inverter. (4) When one input arrives significantly later than the others, unbalancing the gate by increasing the size of the transistors on the early input will speed the delay from the late input.

The logical effort may be a useful measure of computational complexity questions such as what are the best and minimum logical efforts required for each stage of a memory gate capacitance. (4) Many real circuits are too complex to optimize by hand and thus need to be considered with spreadsheets or with scripts.

III. The Gate Delay Model

The gate delay is not only a function of the circuit technology and topology, but also depends upon other factors. Clearly, as the load increases, the delay increases. However a delay consideration needs to take into account the following two additional factors in the generation of nanometer technology: (1) the "slope" of the input signal; and (2) the "reflected parasitics."

A. The Slope-Dependent Gate Delay

The slope of a signal is its rate-of-change when transitioning from a logic 0 to a logic 1, or vice versa. The signal slope can express how fast a signal transits between the different levels. The real circuit design typically uses multiple stages of logic gates. Since the signal driving the next stage is the output signal of the previous stage along its path, the slope of the signal depends on the size of the driver of the previous stage. The rise and fall times, $t_r$ and $t_f$, are often measured between the 10% and 90% transition points that apply to individual signal waveforms.

An instantaneous transition (or step function) would be considered to represent the maximum theoretical slope value. Importantly, the slope of the signal depends on the output characteristics of the driving gate combined with the characteristics of interconnect and the input characteristics of any logic gate(s). For the same output load, the wider driving transistor would drive it faster, and thus the delay would be smaller. For the same driver, the smaller output load would charge and discharge faster, and thus the transition time would be smaller. The average parasitic capacitance of a wire is typically several times larger than the average size of a gate in deep-sub micron technology. This unavoidable parasitics of a wire not only causes the additional delay to the wire itself, but also increases a load to the gate driving it; deteriorating the characteristics of the slope; and thus increasing the gate delay further.

B. The Parasitics Refection-Dependent Gate Delay

Furthermore another parameter to consider is referred to as "parasitics reflection". In a cascade connection of logic stages along the signal path, it is possible for a proportion of the parasitics associated with the input terminals of the next stages and interconnects among the next stages to be "reflected back" through the middle stages and they are visible to the output of the previous stages. Additionally if the middle stages were multi-input gates, then these parasitics reflected back through them may well be state dependent. In other words, they may vary depending on the logic values presented to the other inputs of the middle stages. Generally it was safe to assume that the middle gate(s) would totally buffer the output of the first gate from the parasitics associated among/with the next stages. Thus the output of the stage would only "feel" parasitics; the wiring capacitance and resistance and the capacitances associated with the very next stage.

Two influences of the slope dependency and parasitics refraction need to include in the consideration of the gate delay in nanoscale VLSI design. For these reasons, the method of the logical effort needs to extend in order to capture the influence of other previous/next stages besides that of the nearest stage(s) along the signal path.

C. The Gate Delay Model

FIG. 3 shows a simplified functional block diagram of an example of an inverter chain used to characterize the gate delay. The circuit has nine stages. The first four stages are responsible for shaping the input slope. It has been observed that after a few stages, a homogeneous logic chain settles to its generic slope rate regardless of its initial input slope that has a negligible difference in the slope variation of the input signal transition. Other experiments on other logic chains, such as NAND and NOR gate chains show similar results. It may be inferred that each logic gate has its own nominal slope and has a tendency to converge on it. For this reason, when each stage in the logic gate chain is scaled by the same factor, its delay does not change.

Experimental results also show that as the distance between two stages increases, their influence of parasitics reflection to each other becomes smaller. The fifth and sixth stages contain the gates being characterized. The last stage serves as a load. It is used to compensate for gate-drain overlap capacitance. If it were removed, the output of the sixth stage would switch very rapidly and thus this would increase the effective input capacitance to it (so called Miller effect). Two metrics h and m represent the electrical effort and size of the stage.

As mentioned before, the gate delay of the i-th stage depends on not only its electrical effort but also on those of the previous and next gates. It is worthwhile to mention here that the gate delay is a function of relative size (i.e., the electrical effort h) rather than its absolute size in the logic chain when the secondary effects are ignored. That is, the logic chain will have the same delay as long as all stages increase or decrease their size by the same ratio. Let us define the gate delay of i-th stage as $t_D(\ldots, h_{i-2}, h_{i-1}, h_i, h_{i+1}, h_{i+2}, \ldots) = t_D$ in a logic chain. The term "nominal" refers to stages that have the same electrical effort with that value. For example, the nominal gate delay is the gate delay when all neighbors have the same electrical effort. Then it is clear that $t_D$ will be equal to the nominal delay value of i-th stage, $t_{Dnom}(h_i)$, when $\ldots = h_{i-1} = h_i = h_{i+1} = \ldots$.

FIG. 4a shows the normalized delay difference versus electrical effort of the previous stages ($h_0 = h_1 = h_2 = h_3$ h) when the 4-th and next stages have the same electrical effort ($h_4 = h_5 = h_6 = h_7 = h_8 = h_9 = h_{nom} = 1/2/3/4/\ldots$). The x-axis is for the electrical effort h of the first four stages that is from 1 to 12 for the fixed electrical effort of the rest of stages. The "hhhh1111" represents first four stages that have the same electrical effort of h and the last five stages have the same electrical effort of 1. Along the y-axis, the delay difference is normalized with respect to the nominal delay, or $\{t_D - t_{Dnom}(h_i)\}/t_{Dnom}(h_i)$. Hence, each delay curve passes across zero of the normalized delay difference value when all stages have the same electrical effort, or $t_D = t_{Dnom}(h_i)$. It can be observed that the normalized delay deviation from its nominal value has linear dependency on the electrical efforts of previous stages. However the degree of its dependency gets smaller when the stage under characterization has the higher electrical effort. The reason is that the larger $h_{nom}$ means the larger gate-size ratio between two consecutive stages and thus the gate delay time is related to the electrical effort of that gate with inverse proportionality. More discussion will be at the end of this subsection. The slope of the normalized curve (after taking its first order approximation) is redrawn with respect to $h_{nom}$ and fitted with the second order approximation in FIG. 4b. For the range of the electrical effort, 2~10, generally used in VLSI design, this approximation matches well with experimental data within an error of approximately 1%.

The gate delay is also influenced by the electrical effort of the neighboring stages. That is, the gate delay estimation needs to consider the influence of the signal slope and parasitics reflection of the previous and next stages that the original method of the logical effort misses. Experimental results show that when the previous stage has the smaller electrical effort than the i-th stage ($h_{i-1} < h_i$), the gate delay is faster than the nominal value. Whereas when $h_{i-1} > h_i$, the gate delay time becomes slower. This is expected that since the smaller electrical effort, similar to the above reason, means the larger gate size and faster transition response. Fortunately, this deviation from the nominal gate delay value decreases as it propagates along the isometric stages. Simulations show that two stages later, its influence is less than 1% and is negligible in the 90 nm process.

$$t_D\left(h_4 = \left(\frac{A_2}{h_4}(h_2 - h_4) + \frac{A_3}{h_4}(h_3 - h_4) + \frac{A_5}{h_4}(h_5 - h_4) + 1\right) \times t_{Dnom}(h_4)\right) \quad (2a)$$

$$t_D(h_i) = \sum_{k=i-2, k \neq i0}^{i+1} \frac{A_k}{h_i}(h_k - h_i) \times t_{Dnom}(h_i) \quad (2b)$$

Taking the above discussions into account, the proposed gate delay model for the 4-th gate in a logic chain can be expressed by (2a) where the nominal gate delay $t_{Dnom}(h_4)$ can be obtained by the original method of the logical effort (1).

Experimental results show that the gate delay consideration requires at least two previous stages due to the slope-dependency and one next stage due to the parasitics refraction. In other words, to determine the gate delay, three neighboring stages, two previous stages and one next stage, need to be considered as a window. It has also been observed that the influence of slope-dependency and parasitics refraction of the neighboring stages becomes weaker as the electrical effort of the i-th stage (the i-th gate) becomes larger; thus, the electrical effort of the i-th stage ($h_i$) appears in the denominator of (2a). The other experiments for the practical ranges of h and $h_{nom}$ quite match well with the proposed gate delay model in (2b).

The electrical effort is a ratio of a load capacitance to an input capacitance. When the previous stage has the smaller electrical effort than the i-th stage, it has wider transistors and thus larger driving capability. This improved driving capability is helpful to make the slope of the input signal steep (or faster) to the i-th stage and thus the delay becomes smaller. However, when the next stage has the smaller electrical effort, it has more narrow transistors. Note that the input capacitance of the next stage is the load capacitance of the i-th stage. The narrower transistor of the next stage is helpful to reduce the capacitive load to the i-th stage and thus the delay becomes smaller. On the other hand, the larger electrical effort of the previous or next stages tends to increase the delay. That is, the delay is in proportion to the difference with the electrical effort of the neighboring stages. This is similar to the concept of "inertia" in the kinetic energy theory. Since the larger electrical effort has the bigger capacitive load at the output terminal and/or smaller capacitance at the input terminal, the variation of the slope at the input terminal has less influence on the slope of the output terminal. As a consequence, the delay is inversely proportional to the size of the transistors of the i-th stage. Regarding the coefficient $A_k$ in (2), the (i−2)-th stage (the second previous gate) has about 4%, the (i−1)-th stage (the first previous gate) has about 20% and the (i+1)-th stage has about 10% influence on the gate delay. More neighboring stages may need to consider for smaller technologies and more accurate modeling in the consideration of slope-dependency and parasitics refraction.

IV. The Gate-Interconnect Delay Model

A. Consideration of the Number of Segments and Input Slope Dependency in the Pure RC Network The real wire is different from an ideal one, which is a line on schematics without any electrical effect. The voltage change at one end appears at the other end without propagation delay and IR drop, i.e., equipotential. Even a wire that is in nature a distributed system may be modeled with lumped elements. To get an accurate estimate, an approach with complex electric fields equation in 2D or 3D might need to be solved but is not efficient to take a main advantage of "simplicity" from the theory of the logical effort. Several models have been known for the pure RC network analysis, such as L-model, T-model and π-model. Among those RC models, π-model has excellent accuracy over other L-model or π-model with a same number of segments. On the other hand, the Elmore delay model is a closed form expression and is extremely efficient to compute delay. Elmore delay equation can be represented by a chain network with simplified Elmore delay of three. The Elmore delay model can be effectively applied to the wire with a gate driving or driven by it as in the next section.

$$\tau_{DN} = \sum_{i}^{N} C_i R_{ii} \qquad (3)$$

$$= \sum_{i=1}^{N} C_i \sum_{j=1}^{i} R_j$$

A wiring condition of minimum width and space in a high temperature environment is assumed in 90 nm technology. Delay is measured from 50% transition of the input signal to 50% transition of the output in both rising and falling directions and normalized. The slope of the input signal has swept from an instantaneous transition (or step function) to slow transitions. It can be seen that as the number of segments increases, propagation delay increases and approaches its maximum value, substantially a ln(2) multiple of the Elmore delay. This is because a lumped RC network becomes closer to a distributed RC one with increased number of stages. A 50%-50% transition delay time is close to its limit value with a few number of segments; less than 3% with 2-segments and around 1% with 3 segments.

This means that a π-model with several segments is enough to approximate a wire for the wide range of the input slope. The 3-segment π-model provides a sufficient model of an interconnect for accurate delay estimation. The delay variation with the slope of the input signal will be discussed in detail in the next subsection with the analytical model of a wire driven by a gate.

B. The Input Slope Dependency of the Interconnect Delay

Figure 5:
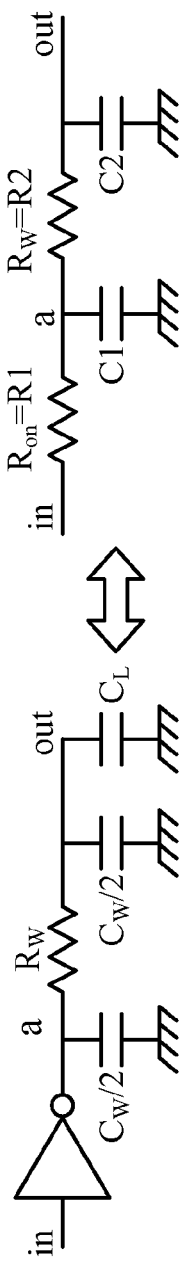
FIG. 5 is a simplified functional block diagram of an embodiment of an RC model of a gate driving a wire.

FIG. 5 illustrates a simple RC network model of a gate driving an interconnect wire. The driving device is modeled as $R_1$ and the wire is modeled as one π-model. Device parasitic capacitance is included in $C_1$ along with half the value of the total interconnect capacitance $C_w$. A load capacitance (input capacitance of the next stage) is included in $C_2$ with the other half of $C_w$. $R_1$ and $R_2$ represent the ON resistance of the device Ron and the interconnect resistance $R_w$ in one π-model, respectively. This subsection will focus on the interconnect delay from the intermediate node a to the output node out.

Figure 6B:
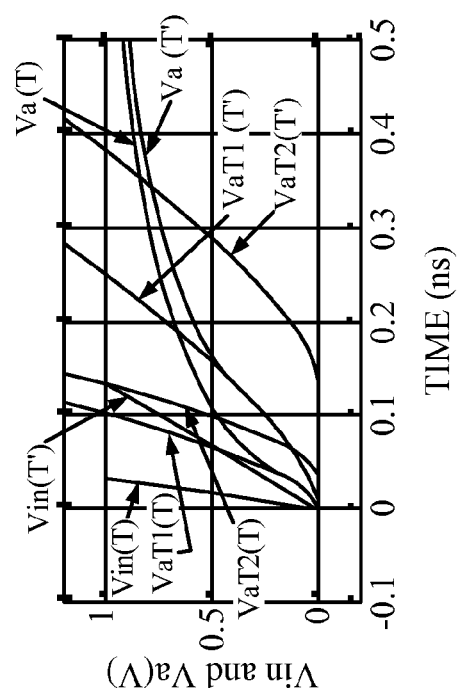
FIG. 6a-b are simplified diagrams of intermediate and output nodes corresponding to a rising input.
Figure 6A:
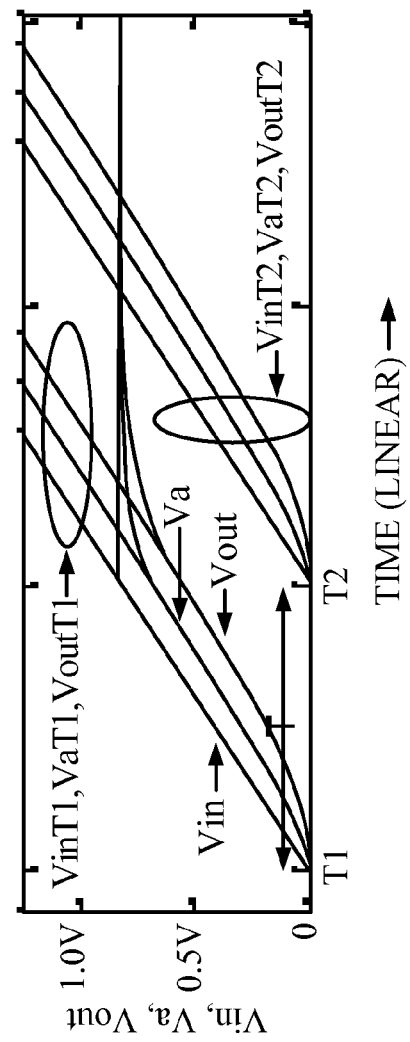

Input signals having varying slopes were observed in the circuit model. The slope of the signals applied to the input node vary from a instantaneous transition to a slow transition. FIGS. 6a and 6b show the responses at the nodes a and output when the input signal transits with the slope metric of T. This trapezoidal input signal $V_{in}$ can be decomposed into two ramp functions, $V_{inT1}$ and $V_{inT2}$. These ramp functions have the same shape but $V_{inT2}$ follows $V_{inT1}$ by the time delay T that determines how fast the input signal changes. Let us define $V_{aT1}$ and $V_{aT2}$ as responses at the node a, and $V_{outT1}$ and $V_{outT2}$ are responses at the output node corresponding to $V_{inT1}$ and $V_{inT2}$, respectively. The total response at the node a (or at the output node) can be obtained by superposition of two individual responses $V_{aT1}$ and $V_{aT2}$ (or $V_{outT1}$ and $V_{outT2}$) since a passive RC network is one of the LTI (Linear Time Invariant) systems. $V_{aT2}$ (or $V_{outT2}$) is a delayed version of $V_{aT1}$ (or $V_{outT1}$) with exactly the same shape. Whereas $V_{aT1}$ (or $V_{outT1}$) tries to increase the potential level, $V_{aT2}$ (or $V_{outT2}$) tries to pulldown it at the intermediate (or output) node for the rising input transition.

$R_1$ is approximately inversely proportional to the size (width) of the device. The actual wire length is very difficult to estimate until layout is complete. A wire may be considered as short when its parasitics are small compared to the gate load that it drives. Similarly a wire may be considered as long when its parasitics are large compared to the gate load that it drives. When interconnect parasitics are comparable to the gate load, it may be called a medium-length wire. Such medium-length wires (corresponding to $R_1 \cong R_2$ or $R_1 \ll R_2$) introduce a strong function of the size of the gate it drives.

Within a functional block, most wires are short and gate delay is dominated by the gate capacitance. For a short interconnect wire (corresponding to $R_1 \gg R_2$), $C_w$ is negligible and gate delay is dominated by gate capacitance; and thus the electrical effort of the gate can be calculated with a ratio of channel width of its size to that of next gate. The wire between functional blocks can often be hundreds or thousands times larger than most transistors in the functional blocks. For a long interconnect wire (corresponding to $R_1 \ll R_2$), however, the interconnect capacitance and resistance should be taken into account in $C_{out}$.

When the input signal transits very slowly (large T), the interconnect delay does not change much and it is already very close to the half of the wire time constant $\tau_w \cong R_2 \times C_2$. The interconnect delay depends on the input slope when $R_1 \ll R_2$. In the case where $R_2$ is much smaller than $R_1$ and the $V_{out}$ at the output node can follow immediately the signal transition at the intermediate node $V_a$. Hence the interconnect delay is almost insensitive to the slope of the input transition and it already saturates with the half of the wire time constant $\tau_w \cong R_1 \times (C_1 + C_2)$. In the extreme case where $R_2 \cong 0$, there is no difference between the intermediate node and the output node and $V_{in} \cong V_a$, the interconnect delay is almost equal to zero and $C = C_1 + C_2 = C_w$.

Although the input slope may decrease, the delay from the intermediate node to output can increase or decrease according to the ratio of two resistances, $R_1$ and $R_2$. This slope dependency of the interconnect delay is clear seen when two resistances are comparable. In this case, the interconnect delay decreases first and then increases and finally saturates as the slope of the input signal decreases. The turning around point is several times of the wire time constant. The response $V_a$ for the ramp input transition can be decomposed into two components, $V_{aT1}$ and $V_{aT2}$. While the $V_{aT1}$ raises the potential level $V_a$, but the $V_{aT2}$ lowers the $V_a$ at the node a for the rising input transition. When $V_{aT2}$ increases faster, it takes more time for the total potential $V_a$ to reach a switching threshold level $V_M$ (or 50% of the supply power). The lowering effect of the $V_{aT2}$ on the $V_a$ is strong when the input signal transits fast (small T) and it becomes weaker as the input slope decreases (or T↑). The strong influence of the $V_{aT2}$ over the $V_a$ helps to decrease the 50%-to-%50 delay time from the node in to the node a. For this reason the total potential $V_a(T')$ follows the $V_{aT1}(T')$ more closely than the $V_a(T)$ follows the $V_{aT1}(T)$ as shown in FIG. 6.b, where T'>T. The response $V_{out}$ can also be decomposed into two components, $V_{outT1}$ and $V_{outT2}$. With the same way of the $V_a$ to follow the $V_{in}$, the $V_{out}$ follows its input stimulus $V_a$ at this time. The $V_{outT1}$ is helpful to increase the $V_{out}$ and the $V_{outT2}$ tries to prohibit an increase in the potential $V_{out}$. The strong influence of the $V_{outT2}$ over the $V_{out}$ is also to decrease the 50%-to-%50 delay time from the node in to the node out. However the 50%-to-50% interconnect delay is the difference between the 50%-to-50% delay from the node in to the node out and from the node in to the node a. That is, the interconnect delay becomes smaller with the in-to-a delay, but the interconnect delay becomes larger with the in-to-out delay. The slope of the $V_a$ that is the stimulus to the $V_{out}$ is less than the slope of the $V_{in}$ that is the stimulus to the $V_a$. Actually these two mechanisms play a role together in the interconnect delay.

The ratio of $R_1$ to $R_2$ determines which one is more important in the interconnect delay for a certain slope of the input signal. When the input signal transits fast (small T), the degree of a decrease in the in-to-a delay is lager than the degree of a decrease in the in-to-out delay, and thus the interconnect delay decreases. This trend continues before the input slope metric T reaches the turning around point. When the input signal transits slower (large T), the degree of a decrease in the in-to-a delay is smaller than the degree of a decrease in the in-to-out delay, and thus the interconnect delay increases. However, when the input signal transits much slower (very large T), the $V_a$ has already enough time to follow exactly the $V_{in}$ transition and the $V_{out}$ also has enough to follow exactly the $V_a$ transition. That is, a sufficiently long slope permits the internal node to become pre-charged almost to the point of $V_M$. Thus when the input signal actually crosses its switching threshold $V_M$, the output node is poised at the starting blocks and appears to switch faster than it would if an instantaneous transition had been applied to the input. Hence there is no more variation in the interconnect delay.

C. The Proposed Interconnect Delay Model in Circuit Design

While a circuit with a single output or a regular structure is relatively easy to design, a real circuit often involves more complex branching and fixed wire loads. Interconnect has fixed capacitance and does not scale down at the same rate as transistors and logic gates. The previous approaches relate the total wire capacitance to the input capacitance of a logic gate and consider this interconnect delay by including the branching effort $b = (C_{gate} + C_{wire})/C_{gate}$ at a gate driving a wire. This branching effort changes whenever transistor sizes in the network changes since the wiring capacitance $C_{wire}$ fails to change in proportion to the transistor size (hence the gate capacitance $C_{gate}$) changes.

Actual wire lengths are very difficult to estimate until layout is complete. A wire may be considered as short when its capacitance is small compared to the gate load capacitance that it drives; and similarly, a wire may be considered as long when its capacitance is large compared to the gate load capacitance that it drives. When interconnect capacitance is comparable to the gate load capacitance, so called a medium-length wire. Such medium-length wires introduce a strong function of the sizes of the gates they drive. Within a functional block, most wires are short and gate delay is dominated by the gate capacitance. For these short interconnect wires, $C_w$ is negligible and gate delay is dominated by gate capacitance; and thus the electrical effort of the gate can be calculated with a ratio of channel width of its size to that of next gate as in (2). Frequently wires between functional blocks can be hundreds or thousands times larger than most transistors in the functional blocks. For these long interconnect wires, however, the interconnect capacitance and resistance should be taken into account in $C_{out}$.

As discussed above, the input slope dependency of signal propagation delay is an important consideration especially in nanometer dimension. To investigate more the influence of the input slope in signal propagation along the wire, the following experiment of three different types of wire pitch were performed: Case1 (W/S=1/1); Case2 (W/S=1/2); and Case3 (W/S=2/2) in the unit of minimum design width and space. All cases have same conditions, such as aspect ratio, dielectric materials and top/bottom materials.

The experimental results offer two insights: (i) that the propagation delay along the wire approaches to its upper limit of the wire after the slope of the input signal decreases enough; and (ii) that the propagation delay already reaches its limit within 2% error when the transition time of the input signal is about 5 times wire time constant. The proposed interconnect delay model and its analysis incorporates these lessons.

Figure 7:
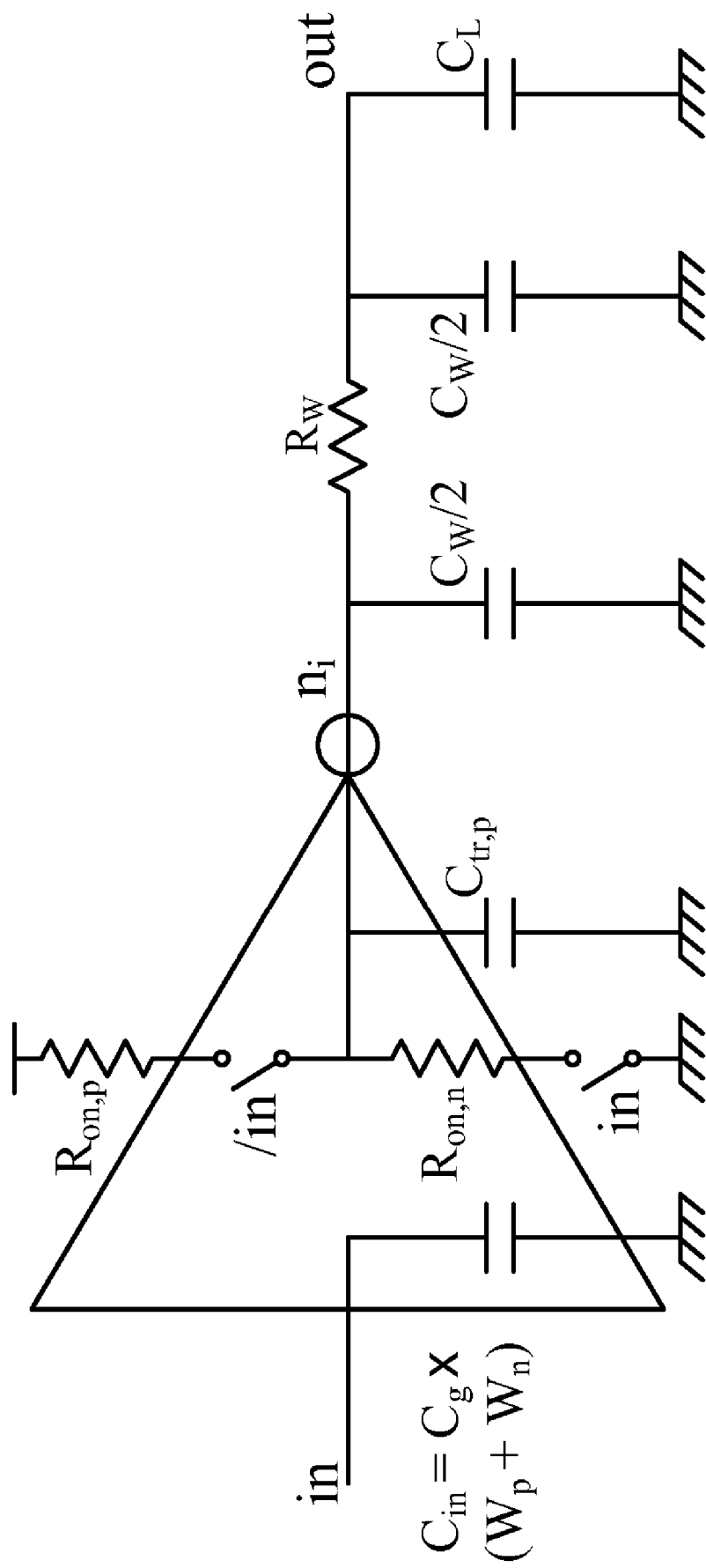
FIG. 7 is a simplified functional block diagram of a switch delay model of a gate driving a modeled interconnect wire.

In real design, such as a memory decoder block design, a chain of amplifiers needs to drive a (long) wire that come with large capacitance and resistance. FIG. 7 is a simplified functional block diagram of a part of the driver and interconnect wire with the first order equivalent switch model (one π-model) when the inverter amplifier drives interconnect. Let $t_p$ be the gate delay that is the average value of $t_{pHL}$ and $t_{pLH}$, $t_p=(t_{pHL}+t_{pLH})/2$. Whereas an increase in the number of stages can make this lumped interconnect model close to the distributed one, this simplest one π-model with Elmore delay model provides a good approximation in terms of signal propagation delay. The wire can be represented by the two components; total interconnect resistance and capacitance, $R_w$ and $C_w$. $R_{on}$ and $C_{tr}$ are amplifier's ON resistance and output parasitic capacitance.

$$\text{Total Delay} = \text{Gate Delay} + RC \text{ Interconnect Delay} \quad (4a)$$
$$= \tau(g \times h'_i + P_{inv}) \times f_1(\ldots, h_{i-1}, h_i, h_{i+1}, \ldots h'_i) + \quad (4b)$$
$$\sum_{i=l}^{N} C_i \sum_{j=1}^{i} R_j + C_L \sum_{i=l}^{N} R_i \times f_2(h'_i, h_i)$$

The total delay from inputs to outputs can be divided into two components, the intrinsic delay (gate delay) and the external delay (interconnect delay) and can be expressed by (4a). The first component is basically same with the pure gate delay equation of (2) except h' rather than h. The effective electrical effort h' (5) is defined as the ratio of output capacitance $C_{out}$ input gate capacitance $C_{in}$, and takes into account the influence of interconnect that increases the capacitive load at the gate output terminal. The total parasitic capacitance (or output capacitance) $C_{out}$ is the sum of the effective wire parasitic capacitance $C'_W$ and parasitic diffusion capacitance (or input gate capacitance) $C_{in}$ of the next gate. Note that the whole wire capacitance $C_w$ can not be seen by the gate because of resistance shielding effect. This shielding effect will be more severe when $R_w$ is much larger than $R_{on}$. Reserving simplicity, it can be represented by the effective wire capacitance (4b). This reflects the ready known fact that the gate delay itself becomes faster with the length of interconnect driven by it. It is important to mention that even the total delay is a sum of two "separate" delay components, the gate delay and interconnect delay in (4a), these two components are smeared to each other so that their inter-dependency should be considered in total delay calculation. The reason is that the gate has influence on the slope of the input signal on the wire that it drives, and the interconnect acts as a parasitic load to the gate that it is driven by. The delay model includes the effective electrical effort h' and two dependency parameters, $f_1$ and $f_2$, to reflect the mutual dependency between gate and interconnect while maintaining the simplicity of analysis.

$$h'_i = h_{i,gate} + h_{wire} \quad (5a)$$
$$= \frac{C_{out}}{C_{in}}$$
$$= \frac{W_{i+1} \times C_{gate\_unit} + C_w}{W_i * C_{gate\_unit}}$$
$$= \frac{W_{i+1} \times C'_w / C_{gate\_unit}}{W_i}$$
$$= \frac{W_{i+1,n}(1+\gamma) + C'_w / C_{gate\_unite}}{W_{i,n}(1+\gamma)}$$

$$C'_w = \frac{C_w}{2} + \frac{C_w}{w} \times \frac{R_{ON}}{R_{ON} + R_w} \quad (5b)$$

$$f_1 = \sum_{k=i-2}^{i-1} \frac{A_k}{h_i}(h_k - h_i) + 1$$

$$f_1 = (A-B)\frac{R_w}{R_w + R_{ON}} + B, \text{ where } A \text{ and } B \text{ are consants} \quad (5d)$$

The effective electrical effort h' of the driver can be obtained by (5), where $h_{gate}$ and $h_{wire}$ are the electrical efforts of the gate and interconnect; and W is the channel width of the gate and a subscript n means the n-type transistor; and $C_{gate\_unit}$ is the gate capacitance of a minimum-length transistor that is a function of fabrication process used; and γ is the ratio of p-type to n-type transistor widths in a gate. As well as the gate capacitance, the wire capacitance is a strong function of process details, such as wire thickness, pitch, and dielectric thickness.

The larger previous gate makes the i-th stage charge or discharge faster. However the i-th stage with the larger electrical effort has less dependency on the sizes of its neighbors since this i-th gate has bigger inertia in terms of electrical momentum. The influence of the next stage after a wire is usually very small since the small next stage has very small the input capacitance compared to the wiring capacitance. Hence the next stage term in (2) is almost ignorable in the gate delay calculation with considerable length of a wire. Similar to the pure logic chain, simulation shows that consideration of the two previous stages is enough in the i-th stage delay calculation. This fact can be simply expressed by (5c). It has been observed that the ratio of $A_{i-2}$ to $A_{i-1}$ is similar to that of (2). That is, the influence of previous stages gets smaller as they are farther from the i-th stage. However, the delay effect of the previous stage acts as an increasing factor when it has the larger electrical effort than the i-th stage whereas it acts as a decreasing factor when it has the smaller electrical effort. For more accurate modeling, we need to consider these two cases separately. For simplicity, this fact is ignored in the work. Again, when the neighbors have the same electrical effort with that of the i-th gate, the gate delay of the i-th stage is not disturbed.

The second component in (4) is basically equal to the pure RC delay equation of (2) except the h' term that represents the input slope dependency of the interconnect delay. Much slower input does not cause the delay response time shorter any more, i.e., delay time becomes saturated since the signal transition along the wire flows closely the input signal transition. This relationship may be expressed by (5d) where $\tau_w$ is the wire time constant, $R_w C_w$.

To quantify the signal transition with certainty when a transition actually starts or ends, the rise and fall times, $t_R$ and $t_F$, are often measured between the 10% and 90% transition points that apply to individual signal waveforms. An instantaneous transition (or step function) would be considered to represent the maximum possible slope value. Recall, the electrical effort is the size ratio of two cascaded stages. As the fan-out of the first stage increases, the gate size of the second stage increases, and introduces more capacitive load to the first stage. Since it takes more time for the gate to drive the next larger stage, the signal transition time (both $t_R$ and $t_F$) increases with $h_{curr}$ along the y-axis. Moreover, since the gate has more than one voltage gain, the increasing rate with $h_{prev}$ is smaller than that along with $h_{curr}$. These nominal transition times, $t_R$ and $t_F$ of $h_{nom}$, have quite excellent linearity and can be modeled by the first order approximation as $$t_{R,nom}(h_{nom}) = h_{nom} \times \text{SLOPE} t_{R\_nom} + \text{OFFSET}_{tR\_nom} \tag{6a}$$

$$t_{F,nom}(h_{nom}) = h_{nom} \times \text{SLOPE} t_{F\_nom} + \text{OFFSET}_{tF\_nom} \tag{6b}$$

These are generic transition times of the gate at the corresponding fan-out. The individual line is also quite linear with fan-out, and its slope is similar to the others. Hence, the slope of all lines may be represented by the average of slope, $\text{SLOPE}_{tR\_vs\_hprev}$ and $\text{SLOPE}_{tF\_vs\_hprev}$ for rising and falling transitions, respectively.

Now the rise and fall time of the gate can be expressed as $$t_R(h_{i-1}, h_i, h_{i+1}) = t_{R,nom}(h_i) - (h_i - h_{i-1}) \times \text{SLOPE}_{tR\_vs\_hprev} - (h_{i+1} - h_i) \times \text{SLOPE}^+_{tR\_vs\_hprev} \tag{6c}$$

$$t_R(h_{i-1}, h_i, h_{i+1}) = t_{R,nom}(h_i) - (h_i - h_{i-1}) \times \text{SLOPE}_{tR\_vs\_hprev} - (h_{i+1}, -h_i) \times \text{SLOPE}^+_{tR\_vs\_hprev} \tag{6d}$$

The $t_{R,nom}$ and $t_{F,nom}$ are of (6a) and (6b) with $h_i = h_{nom}$. The electrical effort for each stage can be easily calculated from the circuit netlist. The third terms in (6c) and (6d) include the stage effort of the next stage in the consideration of the current stage transition time. It is helpful to take into account the fan-out of the next stage ($h_{i+1}$) as well as previous ($h_{i-1}$) and current ($h_i$) stages for more accurate modeling especially in ultra-scaled technologies. Its justification will be discussed briefly in the next subsection. Experiments show that the influence of $h_{i+1}$ on the transition time of the current stage is about 3% and 5% at 90 nm and 65 nm technology nodes.

First, find the nominal rise time at $h_{curr} = 7$ by considering the current stage fan-out as a reference. Since the previous stage has smaller fan-out ($h_{prev} = 3$), the stage of interest transits fasters than the case where the previous stage has same fan-out with the stage of interest ($h_{prev} = h_{curr}$). The compensation is carried out by the second term of (6c). The case where the previous stage has larger fan-out than the stage of interest ($h_{curr} = 4$ and $h_{prev} = 6$). Here, the stage transits slower than the nominal case, $h_{prev} = h_{curr}$.

The gate delay time: Gate delays are defined between 50% transition points of the supply from the gate input to output nodes. Similar to the rise and fall times, the gate delay is a function of relative size (i.e., the electrical effort h) rather than its absolute size when the secondary effects are ignored. This is the reason why a logic chain has the same delay as long as all the stages increase or decrease their size by the same ratio. The gate delay of ith stage in the logic chain can be expressed by $t_D( \ldots, h_{i-1}, h_i, h_{i+1}, \ldots )$. For the nominal case, it is clear $t_D$ will be equal to the nominal delay value, td,nom(hnom) that is a generic value to the gate with $h_{nom} = \ldots = h_{i-1} = h_i = h_{i+1} \ldots$.

When the previous stage has a smaller electrical effort than the stage of interest ($h_{prev} < h_{curr}$), the gate delay is faster than the nominal value and vice versa, since the smaller electrical effort means a larger gate size and faster response as mentioned above. The nominal delays are marked with the (diagonal) solid lines in these figures where $h_{prev} = h_{curr}$. These nominal gate delays, $t_{DHL}$ and $t_{DLH}$ of $h_{nom}$, have excellent linearity and can be modeled by the first order approximation as $$t_{DHL,nom}(h_{nom}) = h_{nom} \times \text{SLOPE}_{tDHL\_nom} + \text{OFFSET}_{DHL\_nom} \tag{7a}$$

$$t_{DLH,nom}(h_{nom}) = h_{nom} \times \text{SLOPE}_{tDLH\_nom} + \text{OFFSET}_{tDLH\_nom} \tag{7b}$$

However, each line has a different slope. The slope value increases with $h_{curr}$. The electrical effort is the ratio of a load capacitance to an input capacitance. The input capacitance of the stage is the load capacitance of the previous stage. When the previous stage has a smaller electrical effort, it has wider transistors and thus larger driving capability. This improved driving capability is helpful to make the signal transition faster, and thus the delay becomes smaller. On the other hand, when the next stage has the smaller electrical effort, it has narrower transistors. The narrower transistor of the next stage means the smaller capacitive load to the stage of interest and thus the stage of interest becomes much faster.

It can be observed that the gate delay curves can be saturated with $h_{prev}$. Once the $h_{prev}$ becomes too large, or the previous stage is too small compared with the stage of interest, its influence on the gate delay is smaller. Hence, the degree of improvement becomes insensitive to the $h_{prev}$ and the slope is saturated. Its saturation point depends on the size of the stage. This requires at least the second order approximation for the delay modeling. Practical circuits are usually designed within the small range of fan-outs whereas the case of the large fan-out usually comes with long interconnect. The offset of the slopes of the delay curves increases quite linearly with $h_{curr}$.

Taking these discussions into account, the high-to-low delay, low-to-high delay, and average delay can be expressed as $$t_{DHL}(h_{prev}, h_{nom}) = \text{SLOPE}_{\text{slope\_tDHL}} * h_{prev} * h_{prev} + \text{OFFSET}_{\text{slope\_tDHL}} * h_{prev} + \text{SLOPE}_{\text{offset\_tDHL}} * h_{nom} + \text{OFFSET}_{\text{offset\_tDHL}} \tag{7c}$$

$$t_{DHL}(h_{prev}, h_{nom}) = \text{SLOPE}_{\text{slope\_tDLH}} * h_{prev} * h_{prev} + \text{OFFSET}_{\text{slope\_tDLH}} * h_{prev} + \text{SLOPE}_{\text{offset\_tDLH}} * h_{nom} + \text{OFFSET}_{\text{offset\_tDLH}} \tag{7d}$$

$$t_D(h_{prev}, h_{nom}) = \frac{1}{2}(t_{DHL} + t_{DHL}) \tag{7e}$$

Here $\text{SLOPE}_{slope}$, $\text{OFFSET}_{slope}$ are the slope of slopes and the offset of slopes, and similarly $\text{SLOPE}_{offset}$, $\text{OFFSET}_{offset}$ are the slope of offsets and the offset of offsets with the first order approximation for corresponding high-to-low and low-to-high delays. With two parameters of $\text{SLOPE}t_{R\_vs\_hprev}$ and $\text{SLOPE}t_{F\_vs\_hprev}$ in (6a) and (6b), these four new parameters will be referred to as the LEparameters. We can extract other LEparameters for different types of logic gates in the same way. Estimated values (asterisk marker) from Eqn. (7c), (7d) and (7e) agree with simulated values with an error of less than 2%.

D. Procedure to Apply the STLE in Circuit Design

In order to apply the STLE model to circuit analysis, we first need to extract the LEparameters. From practical point of view, only four data points suffice to have a full set of the LEparameters; two points are on-diagonal (the nominal cases) and the other two points are off-diagonal (the non-nominal cases). The other values can be obtained by interpolation or extrapolation. More data points increase the precision of the result and increase confidence in the model. The stage delay can be computed one by one, from the primary input (PI) to the last stage. The procedure is as follows.

Given the following information for a particular timing path of a circuit:
1. The primary input slope, $t_{R,PI}$ (or $t_{F,PI}$).
2. The netlist information and the electrical effort of each stage (i.e., gate topologies and $h_1$, $h_2$, ...).
3. The rise and fall times vs. the electrical effort (i.e., $SLOPEt_{R\_vs\_hprev}$ and $SLOPEt_{F\_vs\_hprev}$).
4. The high-to-low and low-to-high gate delays vs the electrical effort (i.e., other LEparameters like $SLOPE_{slope}$).

Perform the following steps:
1. Determine the effective fan-out $h'_{PI}$ for $t_{R,PI}$ (or $t_{F,PI}$) by Eqn. (6a) and (9b).
2. Set i=0 and $h'_{PI}=h'_0$.
3. Calculate $t_{DHL,i+1}$ (or $t_{DLH,i+1}$) from $h'_i$ and $h_{i+1}$ by Eqn. (7c) and (7d).
4. Compute $t_{F,i+1}$ (or $t_{R,i+1}$) from $h'_i$ and $h_{i+1}$ by Eqn. (6c) and (6d).
5. Compute the effective fan-out to the next stage from $t_{F,i+1}$ (or $t_{R,i+1}$) and $h_{i+1}$ by Eqn. (6a) and (6b).
6. if ((i+1)th gate topology=(i+2)th gate topology) then $\{h'_{i+1}=h_{i+1}\}$ else {compute the effective electrical effort at (i+1)th stage, $h'_{i+1}$}
7. Set i=i+1; go to Step 3 until the last stage.

Step 1 calculates the "effective" fan-out for the primary input stimulus $t_{R,PI}$ (or $t_{F,PI}$) by assuming a series of PI gates with the same fan-out $h'_{PI}$ to drive gate 1. With this effective fan-out $h'_{PI}$ and the known fan-out $h_1$, the high-to-low delay $t_{DHL,1}$ and fall time $t_{F,1}$ of gate 1 are calculated. At the same time, the effective fan-out of gate 1, $h'_1$, is computed with its fall time and the next gate fan-out $h_2$. Here, we introduce the effective fan-out $h'_1$ for stage 1 even there is already known fan-out $h_1$ for this stage. This is because a typical circuit usually consists of different types of gates for its functionality implementation. The LEparameters are extracted from each logic gate chain that has the same gate type with different fan-out. Even with the same fan-out, different gates can have different transition times and delay times. Hence, it is required to convert them into their effective or equivalent fan-outs with respect to the gate type of the next stage. This procedure repeats until the last stage is encountered with the alternative the signal transition direction for each stage.

Figure 9:
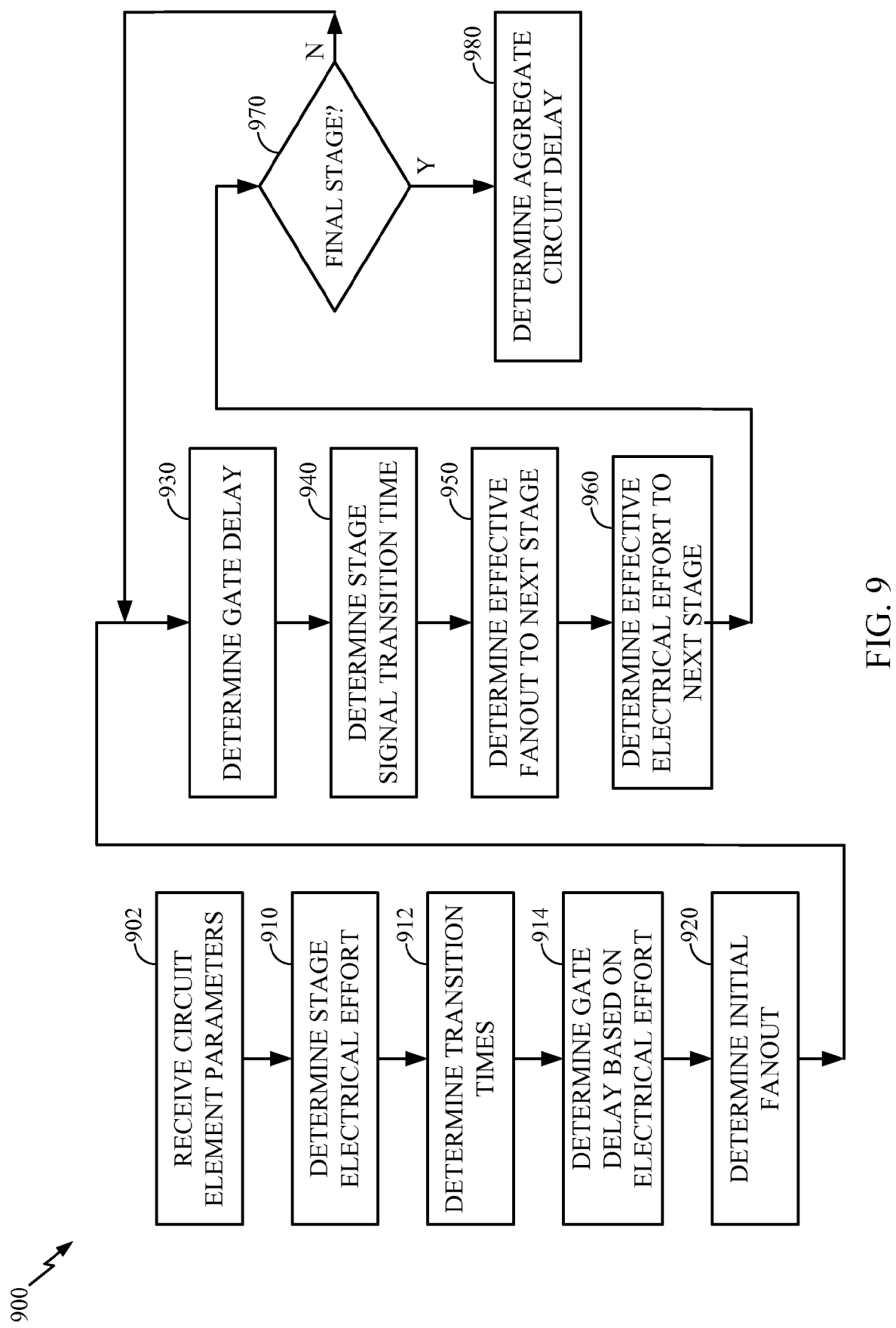
FIG. 9 is a simplified flowchart of an embodiment of a method of delay estimation.

FIG. 9 is a simplified flowchart of an embodiment of a method 900 of estimating a circuit delay. The method 900 can be implemented, for example, in the delay estimation apparatus of FIG. 1 or 2 to estimate the delay of a logic circuit or portion of a circuit.

The method begins at block 902, where the delay estimation apparatus receives circuit element parameters. The delay estimation apparatus can receive a circuit based on library models for each of the devices in the circuit. The library models can be, for example, SPICE circuit models and can include parameters such as the length and width of the logic gates.

The circuit element parameters can be input to the delay estimation apparatus via an input interface, or can be selected from a circuit system stored in memory. For example, a particular portion of a integrated circuit can be selected for delay estimation. The delay estimation apparatus can also determine the π-model of each interconnect in the selected circuit portion.

The delay estimation apparatus proceeds to block 910 and determines the electrical effort for each stage based on the logical gate topologies and the π-model of the interconnects between the gates. After determining the electrical effort for each gate, the delay estimation apparatus proceeds to block 912 and determines the estimate of the rise and fall times based on the electrical effort. In one embodiment, the delay estimation apparatus includes a look up table of rise and fall times relative to electrical effort, and does not need to calculate the values for each delay estimate.

The delay estimation apparatus proceeds to block 914 and determines, for each gate in the selected circuit portion, the high-to-low and the low-to-high gate delays as a function of electrical effort. Again, the delay estimation apparatus may store this information for each of a variety of device types, and may retrieve the information from memory rather than calculating the values each time a delay estimate is determined.

The delay estimation apparatus proceeds to block 920 and begins to analyze the selected circuit portion. The delay estimation apparatus determines the initial fanout at the input of the first gate. The delay estimation apparatus proceeds to block 930 and, based on an initial input signal slope, electrical effort, and the fanout, determines an initial gate delay.

The delay estimation apparatus proceeds to block 940 and determines a gate output signal transition time, such as a signal rise and fall time, based on the electrical effort and the fanout. The circuit rise and fall time is dependent, in part, on the interconnect model. Although not required for the initial stage, the signal rise and fall times for subsequent stages of the circuit are determined based on the electrical effort of at least one previous stage as well as the electrical effort of at least one following stage.

The delay estimation apparatus proceeds to block 950 and determines, based on the rise and fall times and the gate delay, an effective fanout to the next circuit stage experienced by the current circuit stage being analyzed. The delay estimation apparatus proceeds to block 960 and updates the electrical effort of the next stage. The next stage can represent the next device in the circuit or the final output load, depending on the stage being analyzed.

The delay estimation apparatus proceeds to decision block 970 to determine if the current stage represents the final stage. If not, the delay estimation apparatus returns to block 930 to analyze the next stage. If so, the delay estimation apparatus proceeds from decision block 970 to block 980 and determines the total circuit delay based on the delay estimates for each of the circuit stages. Typically, the delay estimation apparatus outputs the aggregate circuit delay, and may also output the intermediate delay estimates corresponding to each of the circuit stages.

V. The Configurations of the Test Circuits

A. Ring Oscillator Circuit

To demonstrate the delay estimation methods and apparatus in nanometer technology, the basic parameters of the logical effort g, parasitic effort p and process parameter τ, are measured in a 31-stage ring oscillator. It is difficult to measure rise and fall times in the test circuit of the ring oscillator because of practical reasons. A test probe contributes its own parasitics, which complicates the ability to see the instant slope dependency of propagation delay. When the signal propagates through the ring, it approaches to its own rise and fall times, $t_r$ and $t_f$. Actually the ring oscillator can be thought as a chain of an infinite number of stages.

$$tD(h) = \frac{T}{2N} \quad (8)$$

The propagation delay or gate delay $t_D$ is determined by the period T of the oscillation of a signal transition through the complete chain, or (8), with N number of stages in the chain. The factor 2 appears in the denominator because a transition must pass twice around the ring oscillator to complete a single cycle of the oscillation. Three different devices and process corners have been implemented with a same circuit to investigate the impact of threshold voltage and process condition on gate delay. Different fan-out circuits are designed to measure the basic parameters.

Figure 8:
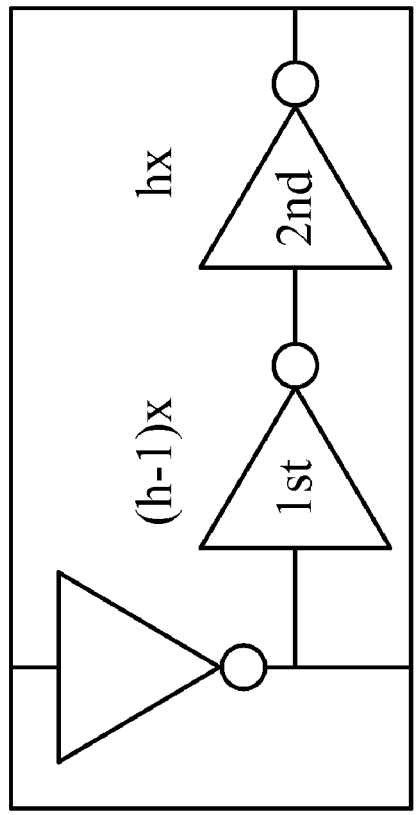
FIG. 8 is a simplified diagram of an embodiment of a ring oscillator.
Figure 8:
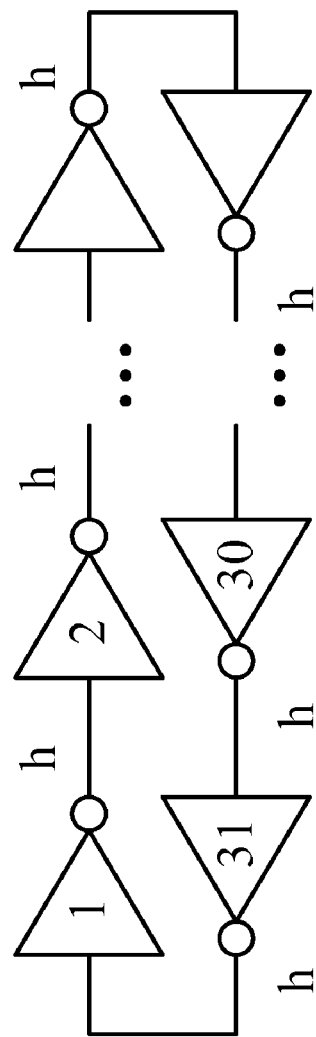
Figure 8:
Figure 8:
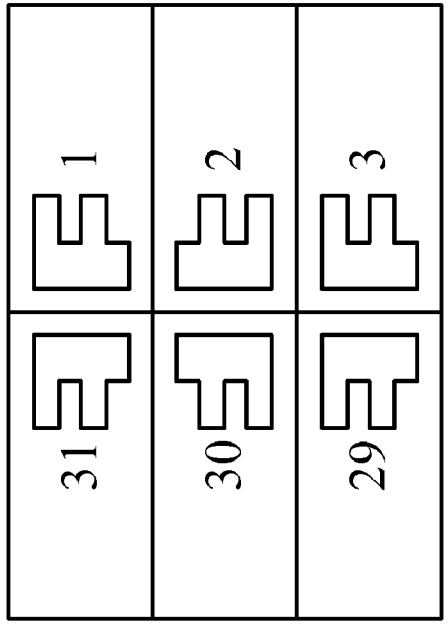
Figure 8:
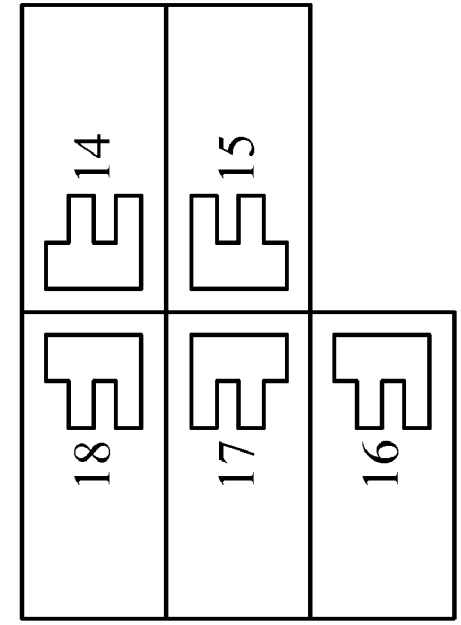

FIG. 8 is a simplified functional block diagram of an embodiment of a ring oscillator. The second loads have been implemented as well as the first loads so that all stages have the specified electrical effort value. Note that the second load are used to negate the Miller effect of gate-drain overlap capacitance that would increase the effective input capacitance to the 1st load; and thus the output of the 1st load gate switch faster. The shape of the ring oscillator is rectangular and different from circle, the ideal form for the ring oscillator.

B. Combinational Logic Circuit

In real circuit design, a variety of logic gates are used together to implement a logic function. The combinational logic modules have been designed to identify the total delay of a combinational logic rather than to measure individual gate delay. Two different threshold voltages and process corners have been implemented and tested. These modules are also ring oscillators. Along the ring, several logic gates are evenly distributed in the order of frequency in use. To avoid the "charge sharing" problem and parasitic delay, each stage propagates the main signal along its innermost input, and thus unused NAND inputs are wired HIGH and unused NOR inputs are wired LOW.

The other test circuits contain the multi-finger transistors so as to decrease diffusion capacitance. These modules however realize the different size of the transistors by different length of active region with one finger.

It has been known that the P:N width ratio giving best average delay is the square root of the P:N width ratio giving equal rise and fall times. Hence for typical CMOS process, the mobility ratio, $\mu = \mu_n/\mu_p$, is between 2 and 3, Even though this best P:N ratio slightly improves the gate delay time, significantly decreases area and power consumption.

C. Interconnect Circuit

The propagation delay and its small variation can be expressed by (9) where $R_{wire}$, $C_{wire}$ and $L_{wire}$ are total lumped resistance, capacitance and inductance, respectively. Inductive parasitics is ignored in this paper. This assumption may make sense since the resistance of the wire is substantial enough because of small cross-section in nanometer scales and the rise and fall times of the applied signals are slow enough in real signal propagation. For very accurate delay estimation, the effect of inductance might need to consider more. Now, the delay equation (9c) has two major parasitic components, capacitance and resistance. However, we still need to know how to characterize $\partial t_D/\partial R$ and $\partial t_D/\partial C$ for better understanding of the propagation delay along the wire. It is hard to separate "completely" the influence of resistive parasitics from that of capacitive parasitics on the propagation delay since the wire is a distributed system in nature. If the resistance-dependent delay part is very small or negligible and the capacitance-dependent part is dominant in the propagation delay, then the delay equation for small variation can be approximated by (9d). Once the resistance-dependency of delay, $\partial t_D/\partial R$ in (7d), is available, we can also measure the capacitance-dependency of delay, at $\partial t_p/\partial C$, by comparing (9d) with (9c). Similarly, if the capacitance-dependent delay part is very small or negligible and the resistance-dependent part is dominant, then the delay equation for small variation can be approximated by (9e). Once the capacitance-dependency of delay, $\partial t_D/\partial R$ in (9e), is available, the resistance-dependency of delay, $\partial t_D/\partial R$, is measured by comparing (9e) with (9c).

$$t_D = f(R_{wire}, C_{wire}, L_{wire}) \quad (9a)$$

$$\Delta t_D = \frac{\partial t_d}{\partial R_{wire}} \Delta R + \frac{\partial t_p}{\partial C_{wire}} \Delta C, \frac{\partial t_p}{\partial L_{wire}} \Delta L \quad (9b)$$

$$\Delta t_D = \frac{\partial t_D}{\partial R_{wire}} \Delta R + \frac{\partial t_D}{\partial C_{wire}} \Delta C, \text{ by neglecting } \Delta L \quad (9c)$$

$$\Delta t_D = \begin{cases} \frac{\partial t_D}{\partial C_{wire}} \Delta C, \text{ for small } R \text{ and } \Delta R \\ = \frac{\partial t_D}{\partial R_{wire}} \Delta R, \text{ for small } C \text{ and } \Delta C \end{cases} \quad (9d, 9e)$$

The interconnect module has been conceived to have an intuitive view of these parasitics' roles in delay. To study the propagation delay along the wire with a gate driving it, we have conceived four different types of test circuits: load-transistor interconnection module, comb-like interconnection module, snake-like interconnect module and straight-line interconnect module.

The interconnect module has been designed with the following variety: different lengths of the wire, 100 nm, 1000 nm and 2000 nm to represent short-wire, medium-wire and long-wire, respectively; and different types of devices, high-Vt, normal-Vt and low-Vt; and different pitches, Case 1(width: space=1:1), Case 2(width:space=1:2) and Case 3(width: space=2:2) in the unit of minimum design width and space. Same are the other conditions, such as the aspect ratio, dielectric materials and distance between the wire and top/bottom materials.

The load-transistor interconnect module uses a load transistor for the "interconnection" part. The load transistor can scale so that it has a specified value of the gate-capacitance equivalent to that of the wire of a particular length. Note that the gate capacitance of a minimum-length transistor is ready known in given technology. Hence, sizing of the load gate over the minimum-length device may realize the (fairly) precise gate-capacitance. The p-type and n-type load transistors are also sized to make capacitive loads balanced during rising and falling transition as much as possible. In fact, the signal itself will cancel out small mismatch caused by the unbalanced (p-type and n-type) capacitive loads when it propagates along the ring oscillator. Moreover, since the physical interconnect used in the load-transistor module is very short, it can be safely assumed that the load-transistor module has only capacitive load equivalent to that of the regular (straight) wire, but no resistive load. Hence, this module is used as a reference to the other test modules for a particular length of the wire. By assuming that resistive parasitics is reasonably minimized and negligible, the analysis is able to separate capacitive parasitics from resistive parasitics. The absolute value of the propagation delay through the ring oscillator module that is a infinite chain of pure gates (no interconnect) can be analyzed. By comparing the delay value of the ring oscillator module with that of the load-transistor interconnect module, we can calculate the capacitance-dependency of delay in (9c).

The comb-like interconnect module has been designed for two purposes. First, we can calculate the wire capacitance implemented by the wire by comparison with the corresponding load-transistor interconnect module. Second, we can, in a certain degree, separate the capacitive impact from the resistive impact on the propagation delay. The Comb-like interconnect module implements a capacitive load with the wire of comb-like shape. The "interconnection" part is sandwiched by two power lines, VDD and GND, in order to shield it and to put it into the worst condition in terms of capacitive coupling with neighbors. The design of the height and width of the "interconnection" part has been carried out, as much as possible, so that its total capacitance matches the parasitic capacitance of the regular (straight-line) wire, but still its total resistance can have very small delay influence along the signal path. That is, the signal propagating along the comb-shaped wire may experience capacitive load equivalent to that of the straight wire, but negligible resistive load. By comparing the delay value of the ring oscillator module with that of the comb-like interconnect module, we can calculate the capacitance-dependency of delay in (9c).

The snake-like interconnect module includes a snake-shaped wire for the "interconnection" part. The wire is also sandwiched by the two power lines for shielding and realization of the worst capacitive condition. Frequently the interconnecting wire needs to bend due to place and routing constraints. Whereas, the straight-line interconnect module implements the "interconnection" part with the regular "straight" line. Theoretically, there is no difference between snake-like interconnect and straight-line interconnect in terms of wire resistance as long as two interconnects have same length. Edge of the bending wire, however, has less wire capacitance than the straight line for given length of the wire. It is clear that the signal will experience both of intrinsic parasitics, resistive and capacitive, when it propagates along the snake-like wire and along the straight-line wire. The propagation delay of both test circuits contains the resistance-dependency and capacitance-dependency at the same time. Hence, by comparing their delays with a sum of two delays, one is of the load-transistor module and the other is of the comb-like module, we can calculate how the propagation delay depends on the interconnect in terms of capacitance and/or resistance. Furthermore, it is worthwhile to examine the bending effect of the wire in silicon. The difference of propagation delay between the comb-like module and the snake-like module and/or the straight-line module will give the insight of the delay dependency on the parasitic resistance of the wire.

In fact, there is a practical limit on realization of an ideal ring (or "circle") oscillator because of the layout style that allows place and routing of elements only in two directions; horizontal or vertical. Hence, irregular pattern may be almost unavoidable in the design of a ring oscillator. To reduce the effect of this irregularity in the work, careful engineering for such irregular pattern has been performed. Especially, in the design of the straight-line module, it would not make sense to connect directly all interconnects in a circle.

In yet another example, a layout includes interconnects run in zigzags. All "interconnection" parts share the space between two consecutive gates. Again, two power lines, VDD and GND, run in parallel with the signal lines alternatively. The parameters $L_{wire}$ and $L_{gate}$ are the length of the signal path (not the wire itself) and the width of the gate, respectively.

Since $L_{wire}$ is determined by the distance between contacts on the wire; and thus $L_{wire}$ is pretty longer than $L_{gate}$ this zigzag-style layout has been devised even with the additional wire segments.

Mismatching portions of the input and output ports of the gate require the additional wire segments. The reason is that the distance from the output to the input is not equal to the distance from the output to the input in next interconnection. Note that two signal lines "fully" share the power line, and the wire consists of the additional segment and the signal path. That is, when the length of the signal path changes, the length of the additional segments changes "negatively" by the same amount. Hence, juxtaposition of all signal lines and power lines with same length approximately makes it possible for the signal path to self-compensate the variation of parasitic loads, caused by its length mismatching. Compensation for the additional segments is required to have the propagation delay along the signal path. The length of the additional segments is already known and hence additional delay caused by it can also be calculated easily. Simulation showed that this approach by using minimum additional segments delivers quite close result to that of the ideal ring oscillator (where all wires are of exactly same length) after compensating the effect of the additional wire segments.

D. The Test Chip

VI. Results and Discussion

The value of τ depends on fabrication process, supply voltage, and temperature. Ideally, the logical effort of a gate would be independent of process parameters. In reality, effects like velocity saturation cause the logical effort to differ slightly with process and operating condition. Similarly, parasitic capacitance and resistance differ with process and environment. This basic delay unit τ has been measured when an inverter driving an identical inverter in an inverter chain, i.e., the electrical effort h is one. The parameters of the logical effort have been measured from the test chip by plotting the frequency of ring oscillators. These ring oscillators with different fanouts provide data for the delay-vs.-electrical effort relationship and for the logical effort and the parasitic delay. FIG. 1 shows graphically the relationship between the unit-less delay of a single logic gate and its electrical effort h. The test chip may include the wiring capacitance and resistance, which many have been neglected in simulation. Delay appears as a function of the electrical effort for an inverter. The slope of each line is the logical effort g and the intercepts of each line at the y-axis is the parasitic delay p of the corresponding gate. The logical efforts of all inverters are nearly 1.00 as they would be. Parasitic delays are rather high, perhaps including local wiring capacitance. Parasitic delay of the larger cells is lower, as should be expected because larger cells can take advantage of multi-fingered (or folded) transistors and a higher transistor-to-wire length ratio to obtain lower parasitics.

More accurate delay model may be achieved when rising and falling transients are modeled separately. This separate consideration should be taken for special logic families, such as dynamic logic and skewed logic. By expressing the delay of circuits in terms of τ, or in the more widely recognized unit of fanout-of-4 (FO4) inverter delay (1 FO4 5), the proposed delay models can predict how gate performance will improve in more advanced processes.

VII. Conclusion

The methods and apparatus for the estimating delay as a combination of gate delay and the interconnect delay has been described where a wire is driven by a logic gate. The interconnect delay quite depends on the slope of the stimulus signal. The important influences of the parasitics refraction and resistance shielding effect need to be captured in the consideration of the interconnect delay, especially in nanoscale electronic circuit design, where the interconnect delay may be dominant over the gate delay.

The delay estimation methods and apparatus provide an efficient yet simple extension of the concept of the logical effort with analytical and qualitative analysis. The delay estimation model matches with experimental results within ±4%. Furthermore the delay model methods and apparatus described herein provide insight into how both wires as well as sizes of different transistors affect the circuit delay.

As used herein, the term coupled or connected is used to mean an indirect coupling as well as a direct coupling or connection. Where two or more blocks, modules, devices, or apparatus are coupled, there may be one or more intervening blocks between the two coupled blocks.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of estimating a circuit delay, the method implemented by a delay estimation apparatus, the method comprising:
   receiving by the delay estimation apparatus device parameters corresponding to a circuit;
   determining an electrical effort of each stage in the circuit;
   determining an estimate transition for each stage in the circuit based on the determined electrical effort;
   determining an effective fanout at an input of an initial stage;
   determining an initial gate delay based in part on an electrical effort at the output of the initial stage, an initial input signal slope, and the effective fanout; and
   determining a gate signal transition time based on an electrical effort of the initial stage, fanout and at least one subsequent stage.

2. The method of claim 1, further comprising:
   determining an effective fanout to a next stage;
   determining an electrical effort corresponding to the next stage; and
   determining a propagation delay of the next stage, based in part on the effective fanout and the electrical effort corresponding to the next stage.

3. The method of claim 1, further comprising determining gate transition times as a function of electrical effort for each stage.

4. The method of claim 1, further comprising determining gate delay as a function of electrical effort for each stage.

5. The method of claim 1, further comprising:
   determining a delay estimate of at least one subsequent stage; and
   determining an aggregate circuit delay by summing the delay estimate for each individual stage.

6. The method of claim 1, wherein determining the electrical effort of each stage in the circuit comprises determining a ratio of gate topologies for adjacent stages of the circuit.

7. The method of claim 1, wherein determining the electrical effort of each stage in the circuit comprises determining an interconnect circuit model of an interconnect coupling adjacent stages.

8. The method of claim 7, wherein the interconnect circuit model comprises a π-model.

9. A method of estimating a circuit delay, the method being implemented by a delay estimation apparatus, the method comprising:
   determining in the delay estimation apparatus an initial gate delay based on an electrical effort of the gate and at least one additional gate coupled to the gate; and
   determining in the delay estimation apparatus a signal transition time based on the electrical effort of the gate and at least one additional gate coupled to the gate; and
   summing the gate delay with the signal transition time;
   wherein the electrical effort comprises a ratio of gate topologies for adjacent stages of the circuit and an effective fanout of an interconnect circuit model of an interconnect coupling adjacent stages.

10. An apparatus configured to estimate a circuit delay, the apparatus comprising:
    a first memory configured to store device parameters;
    a second memory configure to store interconnect parameters;
    an electrical effort module coupled to the first and second memories and configured to determine an electrical effort at each device in the circuit; and
    a Signal Transition Logical Effort (SILL) module configured to determine the circuit delay based in part on the device parameters, interconnect parameters, and electrical effort at each device.

11. The apparatus of claim 10, further comprising a transition time module coupled to the first and second memories and the electrical effort module and configured to determine a signal transition time at each device based on the device parameters, interconnect parameters, and electrical effort.

12. The apparatus of claim 10, further comprising a transition time module coupled to the first and second memories and the electrical effort module and configured to determine a gate delay for each device based in part on the device parameters and the electrical effort.

13. The apparatus of claim 10, further comprising an output device coupled to the STLE module and configured to output at least an aggregate circuit delay determined by the STLE module.

14. The apparatus of claim 10, wherein the electrical effort module determines the electrical effort based in part on a ratio of gate topologies for adjacent stages of the circuit.

15. The apparatus of claim 10, wherein the electrical effort module determines the electrical effort based in part on an interconnect circuit model of an interconnect coupling adjacent stages of the circuit.

16. An apparatus configured to estimate a circuit delay, the apparatus comprising:
  means for storing device parameters corresponding to a circuit;
  means for determining an electrical effort of each stage in the circuit;
  means for determining an estimate transition for each stage in the circuit based on the determined electrical effort;
  means for determining an effective fanout at an input of an initial stage;
  means for determining an initial gate delay based in part on an electrical effort at the output of the initial stage an initial input signal slope, and the effective fanout; and
  means for determining a gate signal transition time based on an electrical effort of the initial stage, the effective fanout and at least one subsequent stage.

17. The apparatus of claim 16, wherein the means for storing device parameters comprises:
  a first memory for storing circuit device parameters; and
  a second memory for storing circuit interconnect parameters.

18. The apparatus of claim 16, wherein the means for determining an electrical effort is configured to determine an electrical effort for each stage of the circuit based in part on a fanout at the output of the stage and an interconnect circuit model.

19. The apparatus of claim 16, wherein the means for determining the gate signal transition time determines the signal transition time of a current circuit stage based in part on a difference of electrical effort between a subsequent stage and the current circuit stage.

20. A processor readable medium comprising executable instructions for:
  receiving device parameters corresponding to a circuit;
  determining an electrical effort of each stage in the circuit;
  determining an estimate transition for each stage in the circuit based on the determined electrical effort;
  determining an effective fanout at an input of an initial stage;
  determining an initial gate delay based in part on an electrical effort at the output of the initial stage, an initial input signal slope, and the effective fanout; and
  determining a gate signal transition time based on an electrical effort of the initial stage, the effective fanout and at least one subsequent stage.

* * * * *